(12) United States Patent
Matsumoto

(10) Patent No.: US 12,256,048 B2
(45) Date of Patent: Mar. 18, 2025

(54) IMAGE READING APPARATUS AND IMAGE FORMING APPARATUS COMPRISING A READING PORTION, THE READING PORTION INCLUDES AN IMAGE SENSOR, CASING, TRANSPARENT MEMBER AND A SHIELD MEMBER BETWEEN THE TRANSPARENT MEMBER AND CASING, AND ELECTRICALLY GROUNDED

(71) Applicant: CANON KABUSHIKI KAISHA, Tokyo (JP)

(72) Inventor: Akira Matsumoto, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 18/464,751

(22) Filed: Sep. 11, 2023

(65) Prior Publication Data
US 2024/0098199 A1   Mar. 21, 2024

(30) Foreign Application Priority Data
Sep. 16, 2022   (JP) ................................ 2022-147717

(51) Int. Cl.
*H04N 1/203*   (2006.01)
*H04N 1/12*    (2006.01)
*H04N 1/00*    (2006.01)
(52) U.S. Cl.
CPC ......... *H04N 1/1235* (2013.01); *H04N 1/2032* (2013.01)

(58) Field of Classification Search
CPC .......... H04N 1/00554; H04N 1/00557; H04N 1/0057; H04N 1/0083; H04N 1/2032; H04N 1/1031; H04N 1/00572; H04N 1/1235; H04N 2201/0094
USPC ......................... 358/474, 498, 408, 505, 496
See application file for complete search history.

(56) References Cited

U.S. PATENT DOCUMENTS 6,496,285 B1 * 12/2002 Fujimoto ............. H04N 1/0315
                                                      358/475
12,028,495 B2 * 7/2024 Matsumoto ........ H04N 1/00554

FOREIGN PATENT DOCUMENTS

JP          2018125752 A        8/2018

* cited by examiner

*Primary Examiner* — Chad Dickerson
(74) *Attorney, Agent, or Firm* — ROSSI, KIMMS & McDOWELL LLP

(57) ABSTRACT

An image reading apparatus including a conveyance portion configured to convey a document in a conveyance path, and a reading portion configured to read an image of a document conveyed in the conveyance path. The reading portion includes an image sensor configured to read an image of a document, a casing accommodating the reading element and including an opening portion having an opening through which an optical path of the reading element extends toward the conveyance path, a transparent member fixed to the casing and covering the opening, and a shield member disposed between the transparent member and the casing, and electrically grounded.

10 Claims, 25 Drawing Sheets

IMAGE READING APPARATUS AND IMAGE FORMING APPARATUS COMPRISING A READING PORTION, THE READING PORTION INCLUDES AN IMAGE SENSOR, CASING, TRANSPARENT MEMBER AND A SHIELD MEMBER BETWEEN THE TRANSPARENT MEMBER AND CASING, AND ELECTRICALLY GROUNDED

BACKGROUND OF THE INVENTION

Field of the Invention

The present invention relates to an image reading apparatus which reads images from documents, and an image forming apparatus to which the image reading apparatus is applied.

Description of the Related Art

Image reading apparatuses disposed in image forming apparatuses, such as copying machines and printers, and including an automatic document conveyance apparatus have been widespread. The automatic document conveyance apparatus serves as a sheet conveyance apparatus; and separates a document (hereinafter referred to also as a sheet), one by one, from other documents placed on a document tray and conveys the document. Japanese Patent Application Publication No. 2018-125752 discloses an image reading apparatus that is being developed and that includes a second reading unit in addition to a first reading unit disposed in a reader that includes a glass on which a document is placed. The second reading unit is disposed in the automatic document conveyance apparatus. This configuration enables the 1-pass duplex scanning, which is a function that can read image information of both sides of a document for duplex scanning, without reversing the document.

The second reading unit includes a casing; a reading element, such as a CIS, that is housed in the casing; and a transparent member, such as a glass plate, that closes an opening portion of the casing. The glass plate is fixed to the casing via a double-sided tape or adhesive. By the way, there is a case in which jam handling or cleaning work is performed in the vicinity of the second reading unit. The cleaning work is performed for removing dust stuck to a document feeding-reading glass.

In a configuration in which a user can access the glass plate disposed in the second reading unit, static electricity may fly from fingertips of the user to the glass plate. In addition, even when a user is not accessing the glass plate, a document may be charged itself with electricity when conveyed, and static electricity may fly from the document to the glass plate.

However, in the above-described Japanese Patent Application Publication No. 2018-125752, the glass plate is fixed to the casing via a double-sided tape or adhesive. Thus, a slight gap is produced between the glass plate and the casing, so that the static electricity from fingertips of a user or a document may fly through the gap to an electric component, such as an LED, disposed in the second reading unit. If the double-sided tape is used as a fixing member for fixing the glass plate to the casing, the static electricity may enter the interior of the second reading unit through the double-sided tape even though the glass plate seems to be closely in contact with the casing via the double-sided tape. This is because the double-sided tape is equal to an air layer in terms of electricity. The same holds true for a configuration in which the glass plate is mechanically fixed to the casing via a hook structure or the like. Thus, the static electricity may cause the failure of an electric component that constitutes the image reading apparatus.

An object of the present invention is to provide an image reading apparatus and an image forming apparatus that can suppress the static electricity from entering the reading portion through the gap between the transparent member and the casing of the reading portion.

SUMMARY OF THE INVENTION

According to a first aspect of the present invention, an image reading apparatus includes a conveyance portion configured to convey a document in a conveyance path, and a reading portion configured to read an image of a document conveyed in the conveyance path. The reading portion includes an image sensor configured to read an image of a document, a casing accommodating the reading element and including an opening portion having an opening through which an optical path of the reading element extends toward the conveyance path, a transparent member fixed to the casing and covering the opening, and a shield member disposed between the transparent member and the casing, and electrically grounded.

According to a second aspect of the present invention, an image forming apparatus includes the image reading apparatus, and an image forming portion configured to form an image that has been read by the image reading apparatus, on a sheet.

Further features of the present invention will become apparent from the following description of exemplary embodiments with reference to the attached drawings.

DESCRIPTION OF THE EMBODIMENTS

Figure 1:
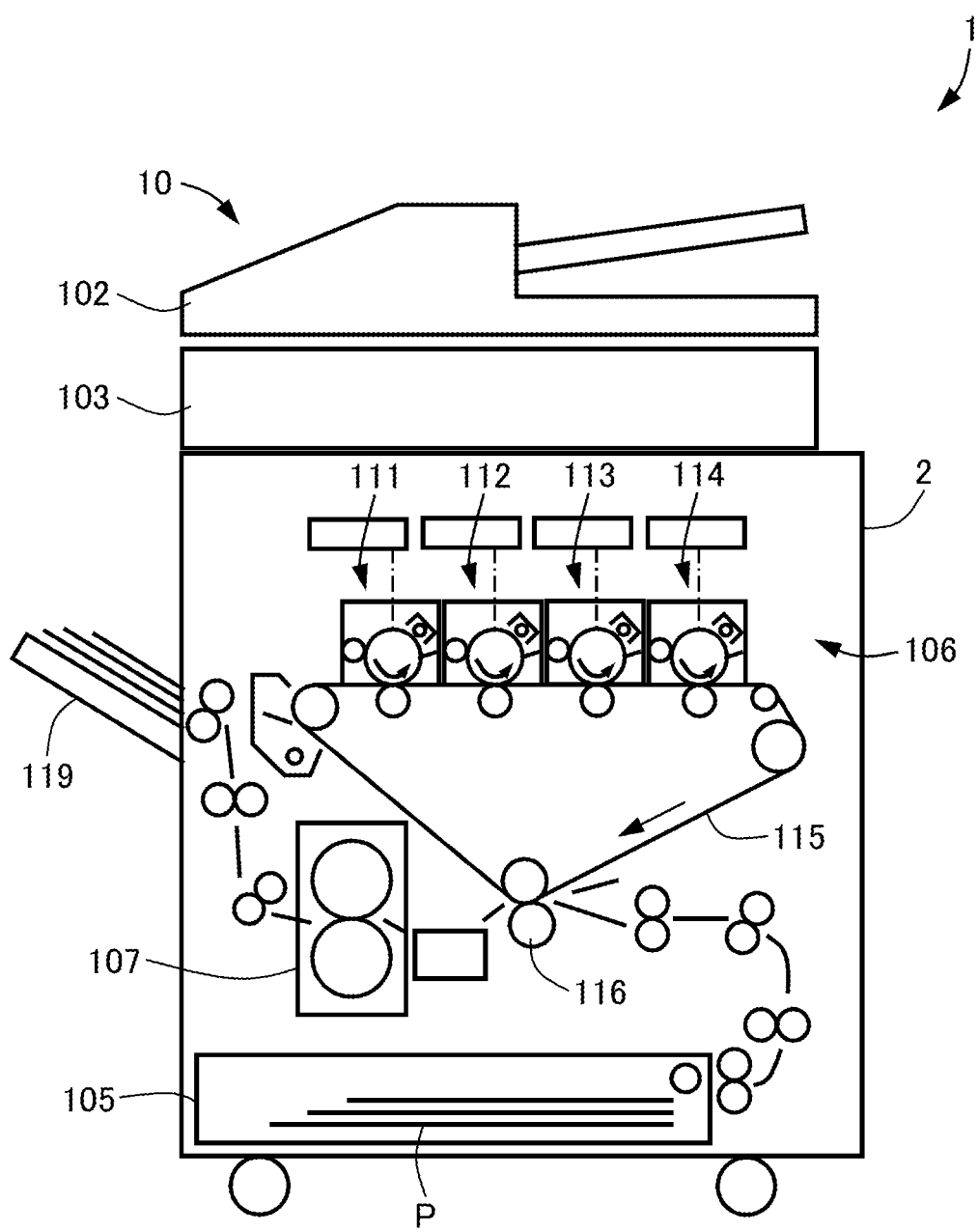
FIG. 1 is a schematic diagram illustrating an image forming apparatus of the present embodiment.

Hereinafter, the present embodiment will be described with reference to FIGS. 1 to 25. First, a schematic configuration of an image forming apparatus of the present embodiment will be described with reference to FIG. 1. FIG. 1 is a cross-sectional view illustrating an image forming apparatus 1 of the present embodiment. In the present embodiment, the image forming apparatus 1 is a full-color copying machine that includes a plurality of photosensitive drums. However, the image forming apparatus 1 is not limited to this. For example, the image forming apparatus 1 may be a monochrome or monocolor copying machine or printer that includes a single photosensitive drum, or may be an ink-jet printer.

Image Forming Apparatus

Next, the image forming apparatus 1 will be described with reference to FIG. 1. The image forming apparatus 1 has a configuration in which an image reading apparatus 10 is disposed above an image forming apparatus body 2. The image forming apparatus 1 conveys a sheet P conveyed from a sheet cassette 105, to an image forming portion 106; and forms a toner image on the sheet P. Then the image forming apparatus 1 conveys the sheet P, on which the toner image has been formed in the image forming portion 106, to a fixing apparatus 107; and causes the fixing apparatus 107 to fix the toner image, still not fixed to the sheet P, to the sheet P by applying heat and pressure to the sheet P. That is, the image forming portion 106 forms an image that has been read by the image reading apparatus 10, on the sheet. The sheet P may be a paper sheet such as a thin paper sheet or a thick paper sheet, a plastic film such as a sheet (OHP) used for overhead projectors, a paper sheet, such as a coated paper sheet, on which surface treatment has been performed, a specialized shape of sheet such as an envelope, or a cloth sheet.

The image forming portion 106 includes stations 111, 112, 113, and 114. The image forming apparatus 1 also includes an intermediate transfer belt 115 and a secondary transfer outer roller 116. The stations 111, 112, 113, and 114 respectively form toner images of yellow, magenta, cyan, and black on the intermediate transfer belt 115. The configurations of the stations 111, 112, 113, and 114 are the same as each other, except that the colors of toner are different from each other. The toner images formed by the stations 111, 112, 113, and 114 are transferred onto the intermediate transfer belt 115. The secondary transfer outer roller 116 transfers the toner image formed on the intermediate transfer belt 115, onto the sheet P conveyed from the sheet cassette 105. The fixing apparatus 107 fixes the toner image transferred onto the sheet P, to the sheet P by applying heat and pressure to sheet P. The sheet P to which the toner image has been fixed is discharged to a discharging tray 119.

Image Reading Apparatus

Figure 2:
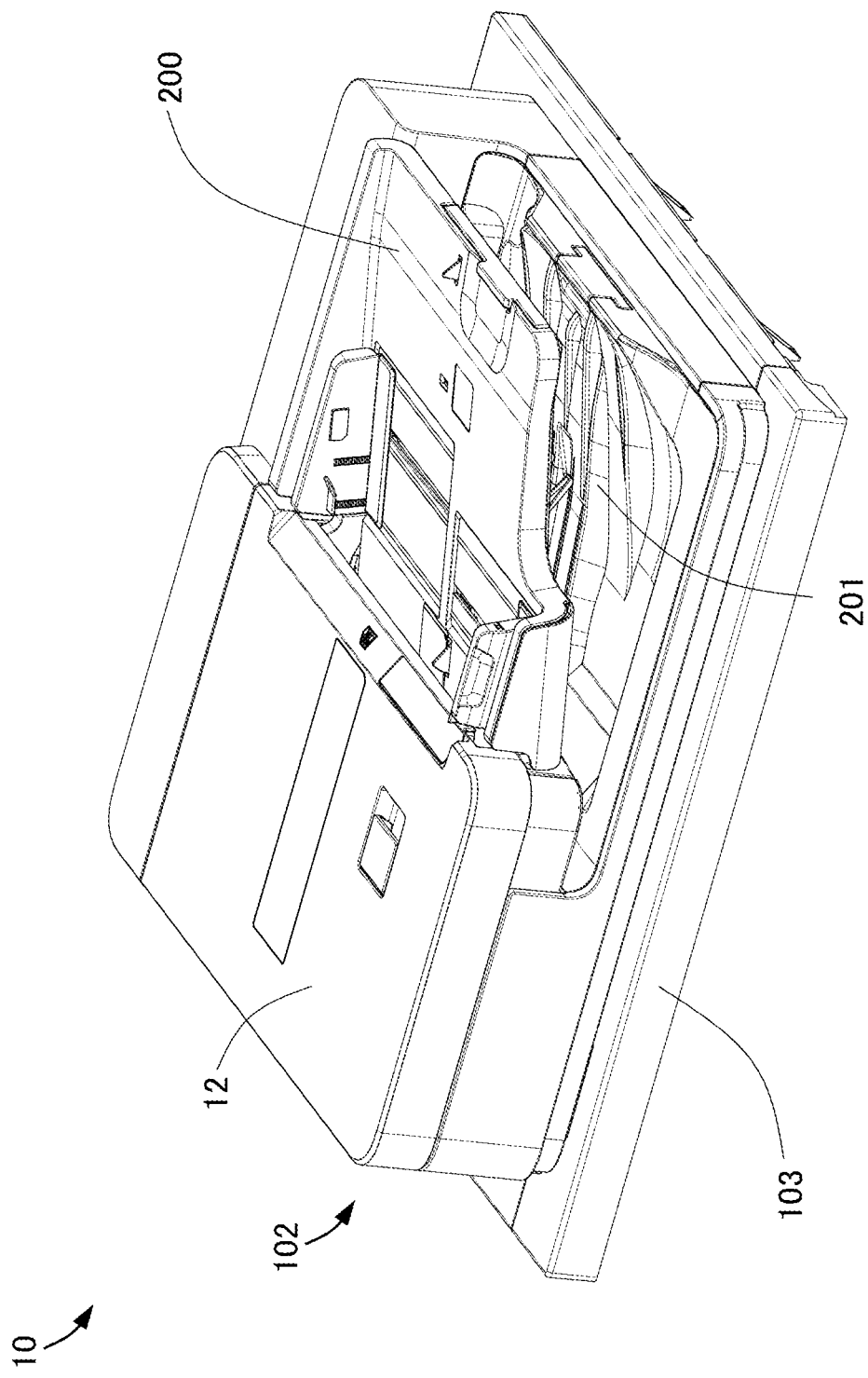
FIG. 2 is a perspective view illustrating an image reading apparatus of the present embodiment.
Figure 3:
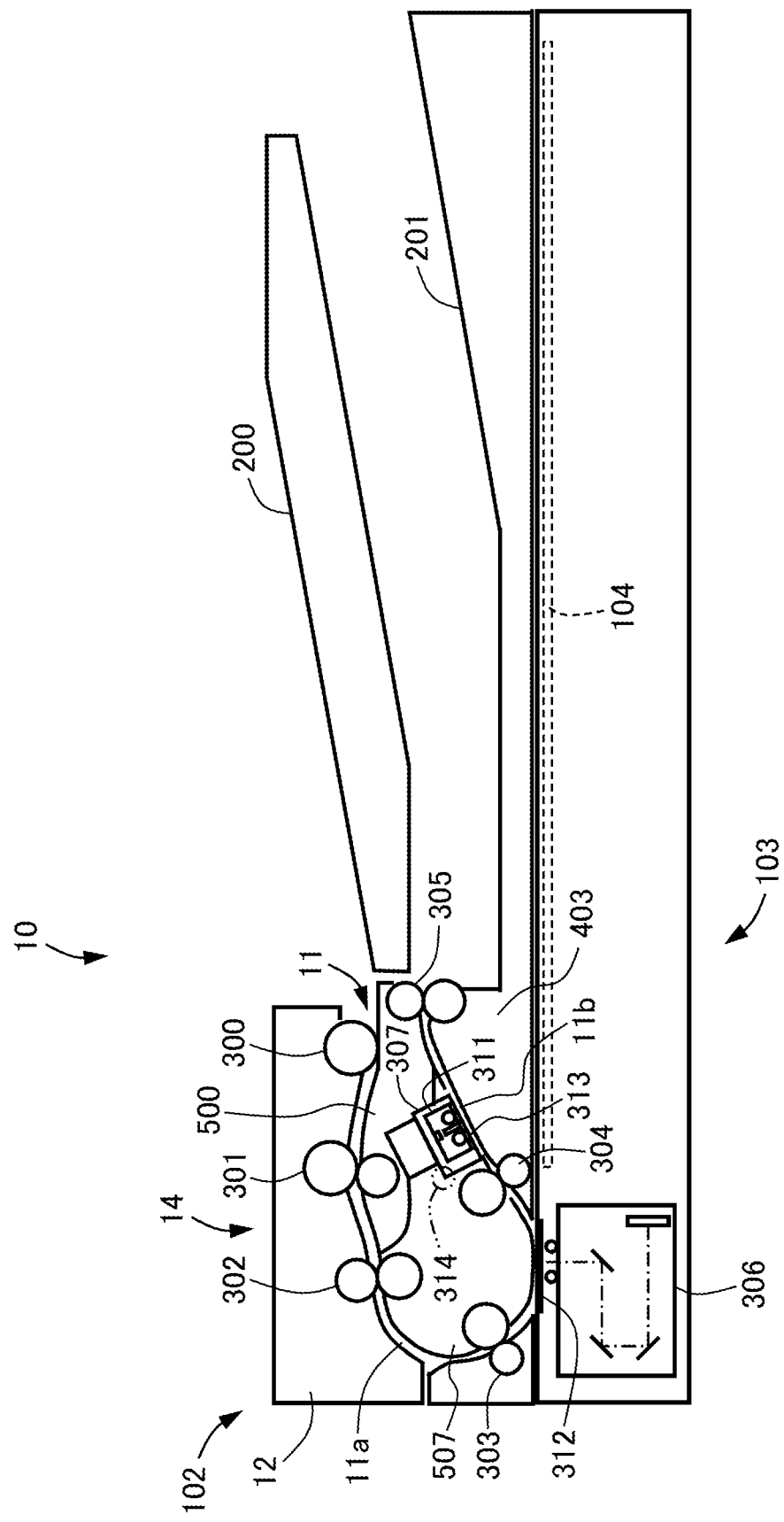
FIG. 3 is a cross-sectional view illustrating the image reading apparatus of the present embodiment.

FIG. 2 is a perspective view illustrating the image reading apparatus 10. As illustrated in FIG. 2, the image reading apparatus 10 includes a reader 103 and an auto document feeder (ADF) 102, which are disposed above the image forming apparatus body 2. The reader 103 reads the image of a document that is set by a user. FIG. 3 is a cross-sectional view illustrating the image reading apparatus 10. As illustrated in FIG. 3, the ADF 102 conveys a plurality of documents that is set on a document tray 200, into the interior of the image reading apparatus 10, so that a first reading unit 306 and a second reading unit 307, which are disposed in the image reading apparatus 10, can read the image of the document. Specifically, the document placed on the document tray 200 is conveyed along a conveyance path 11 by a conveyance portion 14. The conveyance portion 14 includes a feeding roller 300, a conveyance roller 301, a conveyance roller 302, a conveyance roller 303, a conveyance roller 304, a discharging roller 305, and a guide member. The guide member forms the conveyance path 11.

The image information of a first side of the document is read, via a first document-feeding-reading glass 312, by the first reading unit 306 disposed in the reader 103. The document is further conveyed by the conveyance roller 304, and the image information of a second side of the document, opposite to the first side, is read, via a second document-feeding-reading glass 313, by the second reading unit 307 disposed in the ADF 102. The second reading unit 307 reads the image of a document in a position in which the second reading unit 307 is fixed with respect to the conveyance portion 14 relatively. After the image of the document is read, the document is discharged to a discharging tray 201 by the discharging roller 305. In addition, the reader 103 includes a document platen glass 104, and a document can be placed on the document platen glass 104 by opening and closing the ADF 102. In this case, the reader 103 can read the image of the document by moving the first reading unit 306 in a sub-scanning direction and causing the first reading unit 306 to scan the document.

In the present embodiment, the ADF 102 includes an outer cover 12 that is one example of a first cover, a conveyance guide member 507, a separation guide member 500, the second reading unit 307, and a reading-guide member 403. The outer cover 12 can move between a first closed position in which the outer cover 12 is closed and a first open position in which the outer cover 12 is opened. In the first closed position, the outer cover 12 forms an upper conveyance path 11a of the conveyance path 11, formed between the outer cover 12 and both the conveyance guide member 507 and the second reading unit 307. The upper conveyance path 11a is one example of a first portion of the conveyance path 11. In the first open position, the outer cover 12 opens the upper conveyance path 11a. In the present embodiment, in the first closed position, the outer cover 12 forms the upper conveyance path 11a between the outer cover 12 and both the conveyance guide member 507 and the separation guide member 500. The reading-guide member 403 is disposed opposite to the separation guide member 500 with respect to the second reading unit 307, and forms a lower conveyance path 11b between the reading-guide member 403 and the second reading unit 307. The lower conveyance path 11b is a portion of the conveyance path 11, and is continuous with the upper conveyance path 11a.

Second Reading Unit

Figure 4:
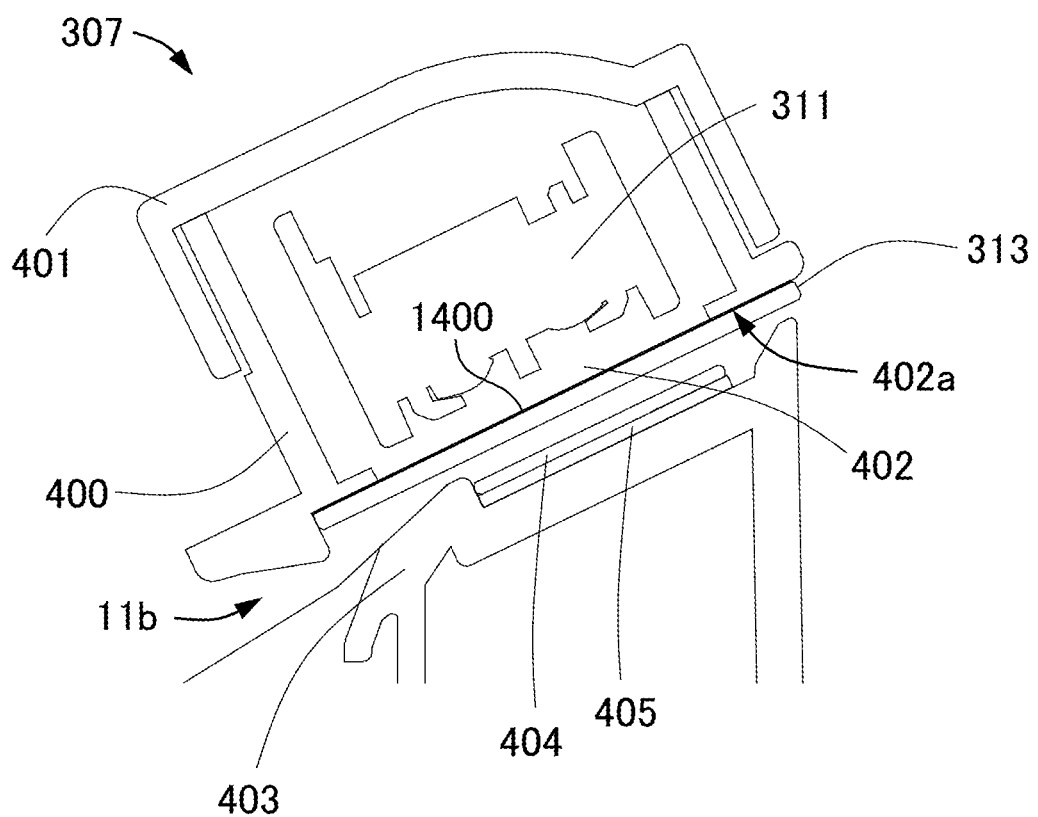
FIG. 4 is a cross-sectional view of a second reading unit of the present embodiment.

FIG. 4 is a cross-sectional view of the second reading unit 307. The second reading unit 307 is one example of a reading portion and a second reading portion. As illustrated in FIG. 4, the second reading unit 307 includes a first casing member 400 and a second casing member 401 that are one example of a casing, a CIS 311 that is a contact image sensor, and the second document-feeding-reading glass 313. The second reading unit 307 moves relative to the conveyance guide member 507 (see FIGS. 5 to 8) by pivoting and linearly moving with respect to the conveyance guide member 507. Note that although the second reading unit 307 pivots and linearly moves with respect to the conveyance guide member 507 in the present embodiment, the present disclosure is not limited to this. For example, the second reading unit 307 may simply pivot with respect to the conveyance guide member 507, may simply move linearly with respect to the conveyance guide member 507, or may perform other relative movement with respect to the conveyance guide member 507. The CIS 311 is one example of an image sensor (reading element) that reads the image of a document, and is housed by the first casing member 400 and the second casing member 401. The CIS 311 is connected to a below-described FFC 9, and reads the image of a sheet conveyed along the lower conveyance path 11b of the conveyance path 11.

A portion of the first casing member 400 on a side of the conveyance path is provided with an opening portion 402 for reading the image information of a sheet conveyed. The opening portion 402 is one example of an opening portion. That is, the first casing member 400 includes an edge portion 402a that is one example of an opening-portion forming portion. The edge portion 402a forms the opening portion 402, through which the optical path of the CIS 311 extends toward the lower conveyance path 11b. That is, the first casing member 400 includes the opening portion 402 through which light passes to the CIS 311. The second document-feeding-reading glass 313 is stuck on the edge portion 402a so as to cover the opening portion 402. That is, the second document-feeding-reading glass 313 is one example of a transparent member, and covers the opening portion 402 when stuck on the first casing member 400. The reading-guide member 403 that serves as a conveyance guide member is disposed on the outer side of the second document-feeding-reading glass 313, that is, on the side of the conveyance path of the second document-feeding-reading glass 313. The reading-guide member 403 is provided with a white sheet 405 and a protective glass 404, disposed so as to face the CIS 311. The protective glass 404 protects the white sheet 405. The white sheet 405 is disposed for performing the shading compensation of the CIS 311 before the image information of a document is read. The protective glass 404 is disposed so that the surface of the white sheet 405 is not damaged (e.g., scratched) by a document conveyed.

Figure 5:
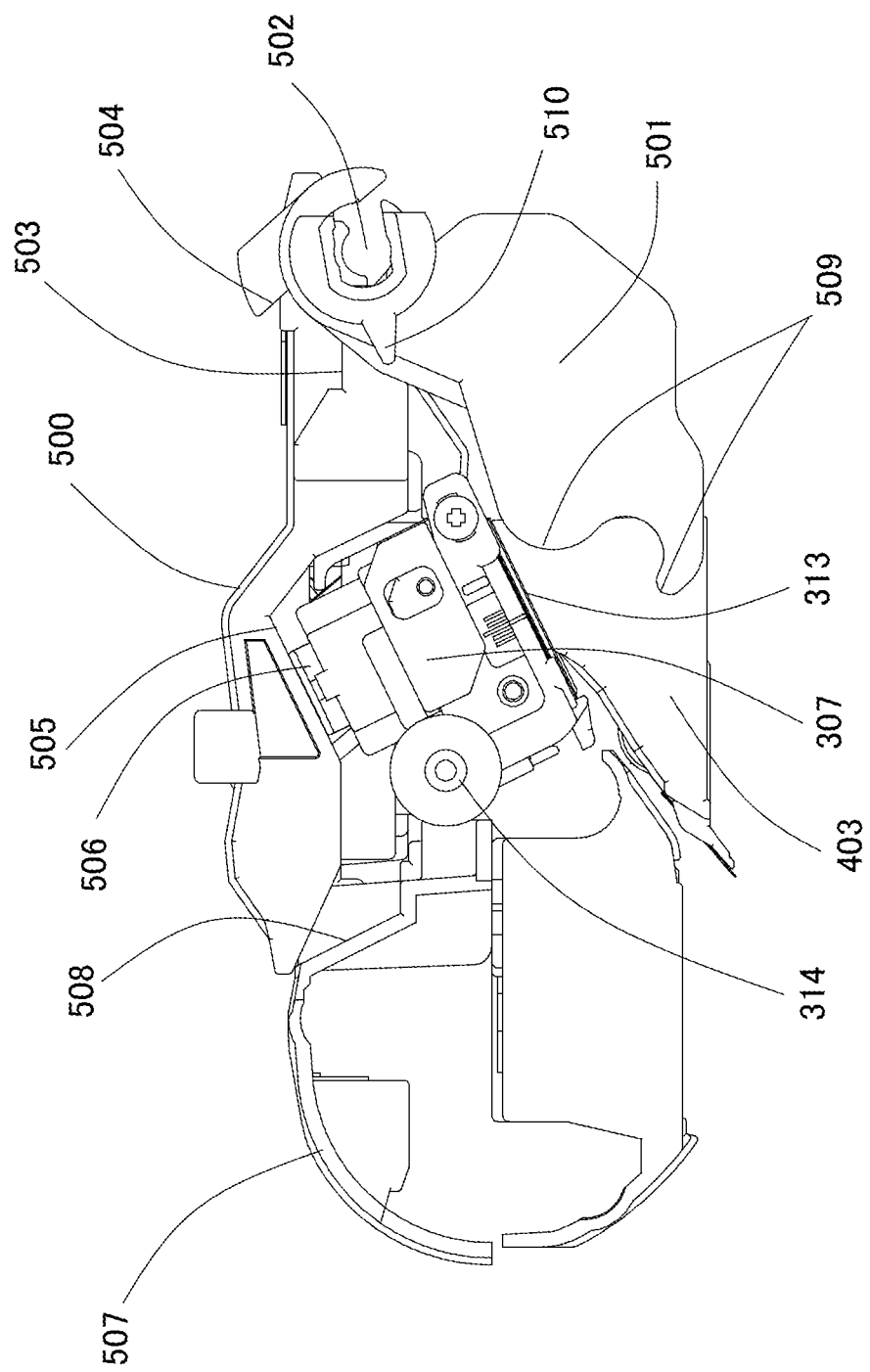
FIG. 5 is a front view illustrating a state where the second reading unit and a separation guide member of the present embodiment are located in closed positions.

Next, how the second reading unit 307 pivots in the ADF 102 of the present embodiment will be described with reference to FIGS. 5 to 8. FIGS. 5 to 8 are front views illustrating a configuration for pivoting the second reading unit 307 of the present embodiment. As illustrated in FIG. 5, in the interior of the ADF 102, the separation guide member 500, the conveyance guide member 507, and the reading-guide member 403 constitute the conveyance guide. The separation guide member 500 is one example of a second cover, and constitutes a half side of the conveyance guide of the feeding and separation portion. That is, the separation guide member 500 is disposed closer to the upper conveyance path 11a than the second reading unit 307 is. The separation guide member 500 can move between a second closed position (FIG. 5) in which the separation guide member 500 is closed and a second open position (FIG. 8) in which the separation guide member 500 is opened. In the second closed position, the separation guide member 500 covers the second reading unit 307 and an exposed portion 90; in the second open position, the separation guide member 500 opens the second reading unit 307 and the exposed portion 90. The second reading unit 307 is disposed so as to be able to pivot on a pivot shaft 314. The second reading unit 307 can pivot between a reading position in which the second document-feeding-reading glass 313 faces the reading-guide member 403 and an exposed position in which the second document-feeding-reading glass 313 is exposed, when viewed from above, to the outside of the apparatus. The reading position is a position in which the second reading unit 307 reads the image of a document. Note that as illustrated in FIG. 3, when the outer cover 12 is located in the first closed position, the outer cover 12 covers the upper portion of the separation guide member 500. Thus, if the outer cover 12 is opened until the outer cover 12 is located in the first open position, it becomes possible to pivot the separation guide member 500.

The conveyance guide member 507 guides a document in a position positioned downstream of the separation guide member 500 in the document conveyance direction. The conveyance guide member 507 constitutes a half side of the conveyance guide that is bent. The reading-guide member 403 constitutes a conveyance guide that the second reading unit 307 faces. The separation guide member 500 is provided with the pivot shaft 502, and can be pivoted by a user for performing the jam handling and cleaning the second document-feeding-reading glass 313 disposed on the second reading unit 307 and the protective glass 404 disposed for the white sheet 405. Note that in the present embodiment, members necessary for describing the configuration of the present invention are mainly described schematically.

Next, a state where the second reading unit 307 and the separation guide member 500 are located in closed positions, as illustrated in FIG. 5, will be described. In this state, a pressing portion 505 formed in the separation guide member 500 pushes down a pressed portion 506 formed in the second reading unit 307, downward from above. Thus, the second document-feeding-reading glass 313 of the second reading unit 307 abuts against the reading-guide member 403 that faces the second document-feeding-reading glass 313, with a predetermined clearance being formed, so that the conveyance path is formed. Furthermore, a cam member 501 that serves as an interlocking member is disposed on the pivot shaft 502 of the separation guide member 500. In addition, the separation guide member 500 is provided with a first contact portion 503, and the cam member 501 is provided with a second contact portion 504.

Figure 6:
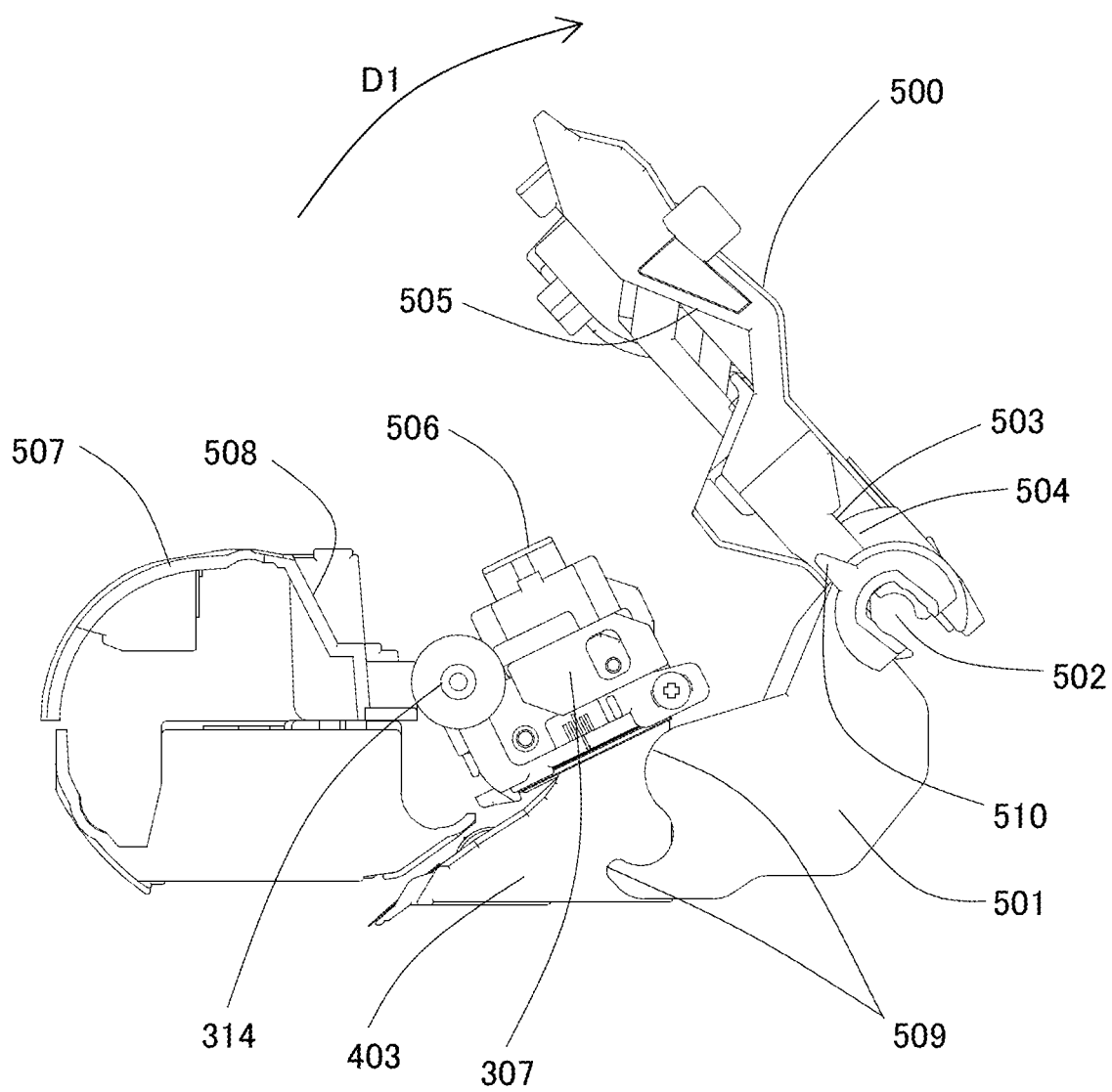
FIG. 6 is a front view illustrating a state where the separation guide member of the present embodiment has been pivoted.

FIG. 6 is a front view illustrating a state where the separation guide member 500 has been pivoted in a D1 direction. If the separation guide member 500 is pivoted by a predetermined angle or more, the cam member 501 also pivots in synchronization with the separation guide member 500 (see FIGS. 6 to 8). Furthermore, the separation guide member 500 is provided with a first projection portion 510. Thus, if the separation guide member 500 is pivoted by a predetermined angle or more, the first projection portion 510 abuts against a below-described second projection portion 1901, so that the pivoted state is kept.

Figure 7:
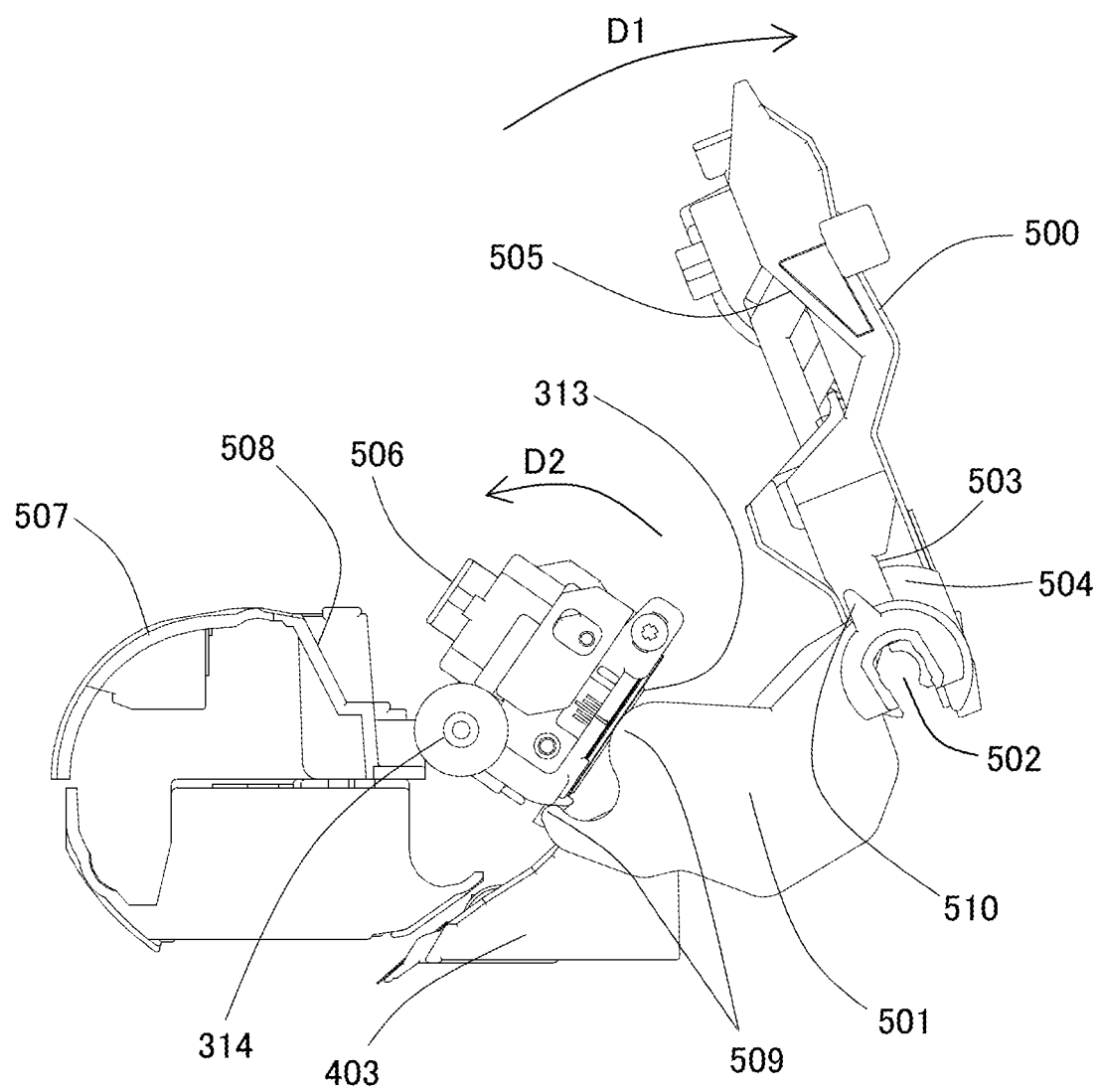
FIG. 7 is a front view illustrating a state where the separation guide member of the present embodiment is pushing up the second reading unit.

On the other hand, the second reading unit 307 is provided with the pivot shaft 314. FIG. 7 is a front view illustrating a state where the separation guide member 500 is pushing up the second reading unit 307 in a D2 direction via the cam member 501. As illustrated in FIG. 7, if the separation guide member 500 is pivoted by a predetermined angle or more, a cam portion 509 of the cam member 501, which pivots in synchronization with the separation guide member 500, abuts against the second reading unit 307. Thus, the second reading unit 307 starts to pivot on the pivot shaft 314 in the D2 direction, in synchronization with the pivot motion of the separation guide member 500.

Figure 8:
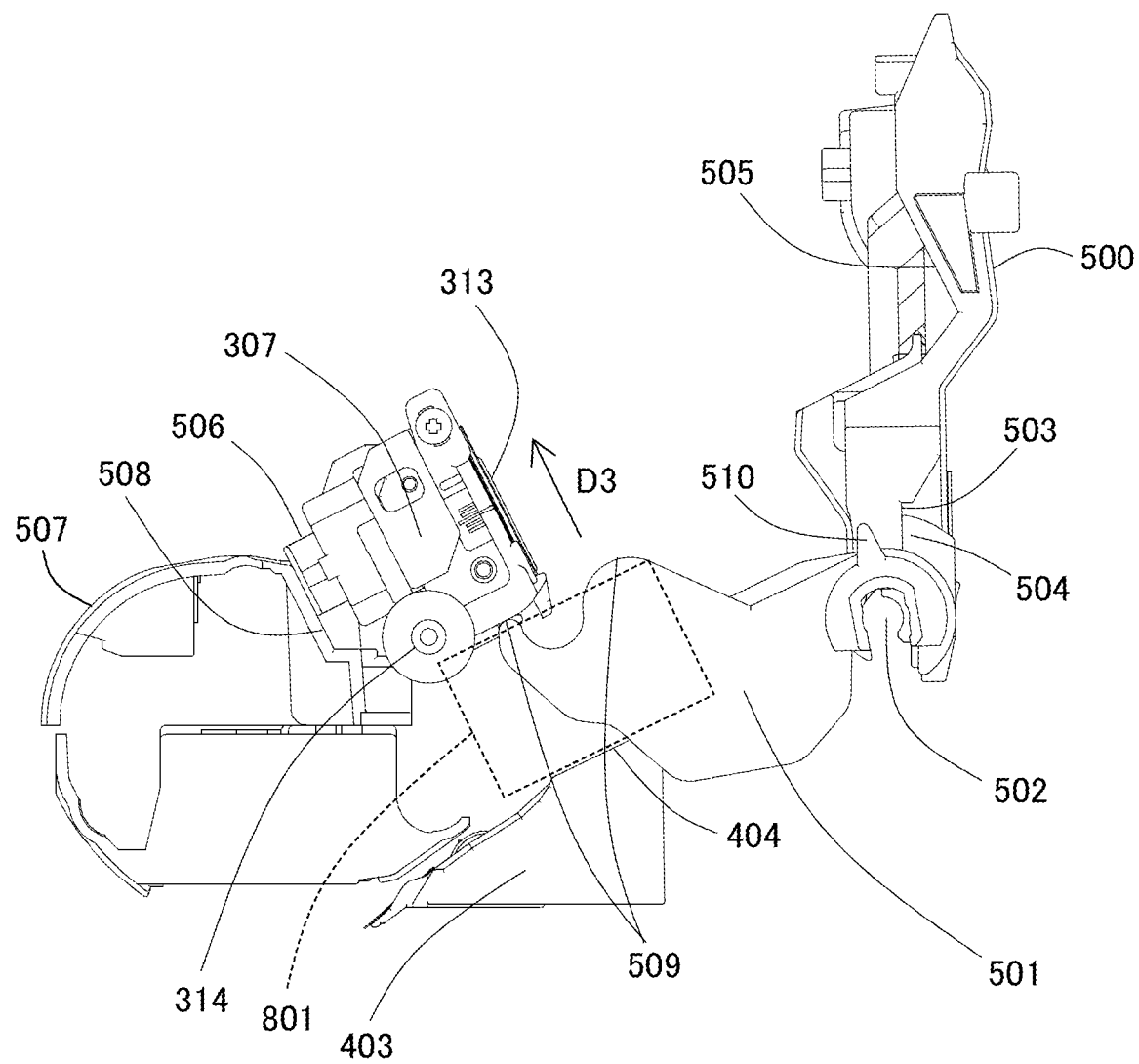
FIG. 8 is a front view illustrating a state where the second reading unit and the separation guide member of the present embodiment are located in open positions.

FIG. 8 is a front view illustrating a state where the second reading unit 307 and the separation guide member 500 are located in open positions. As illustrated in FIG. 8, if the second reading unit 307 is pivoted by a predetermined angle, the pressed portion 506 formed in the second reading unit 307 abuts against an angle regulation portion 508 formed in the conveyance guide member 507, so that the second reading unit 307 is prevented from pivoting. In addition, the second reading unit 307 that is prevented from pivoting is caused to slide in a D3 direction, by the cam member 501. In the state illustrated in FIG. 8, the pivoted state of the separation guide member 500 is finally kept by the second projection portion 1901, which is a pivot regulation portion, and the pivoted state of the second reading unit 307 is also kept by the separation guide member 500 whose pivoted state is kept.

When documents are being conveyed, a user was not able to access the second document-feeding-reading glass 313 and the protective glass 404 of the white sheet 405, as illustrated in FIG. 5. In the present embodiment, however, as illustrated in HG 8, a user can access both the second document-feeding-reading glass 313 and the protective glass 404 of the white sheet 405 by pivoting the second reading unit 307 and the separation guide member 500. In particular, since the second reading unit 307 slides, as illustrated in FIG. 8, in the D3 direction in the latter half of the pivot motion, it becomes possible to secure a cleaning space 801 for cleaning the protective glass 404 of the white sheet 405.

FFC

Figure 9:
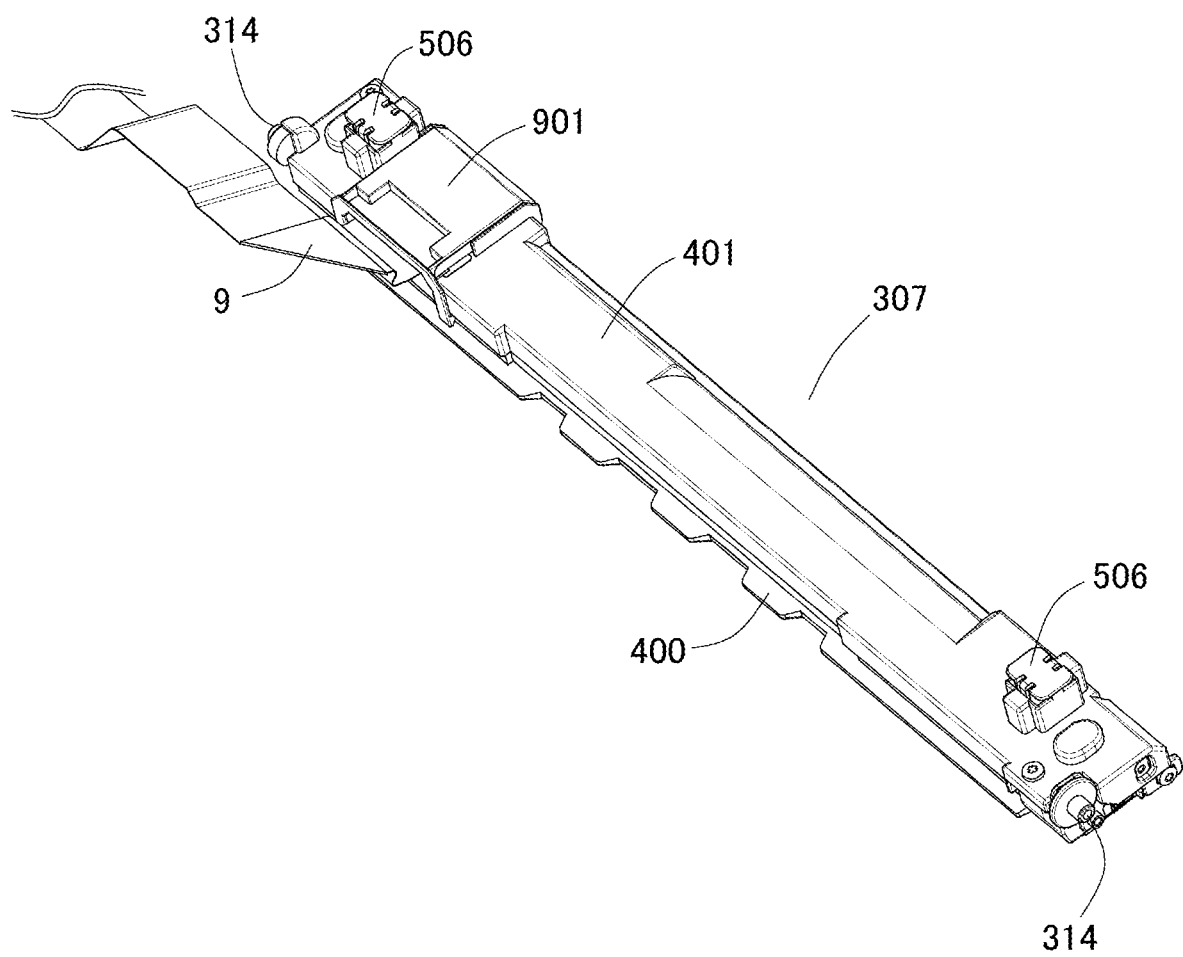
FIG. 9 is a perspective view illustrating the second reading unit and an FFC of the present embodiment.
Figure 10:
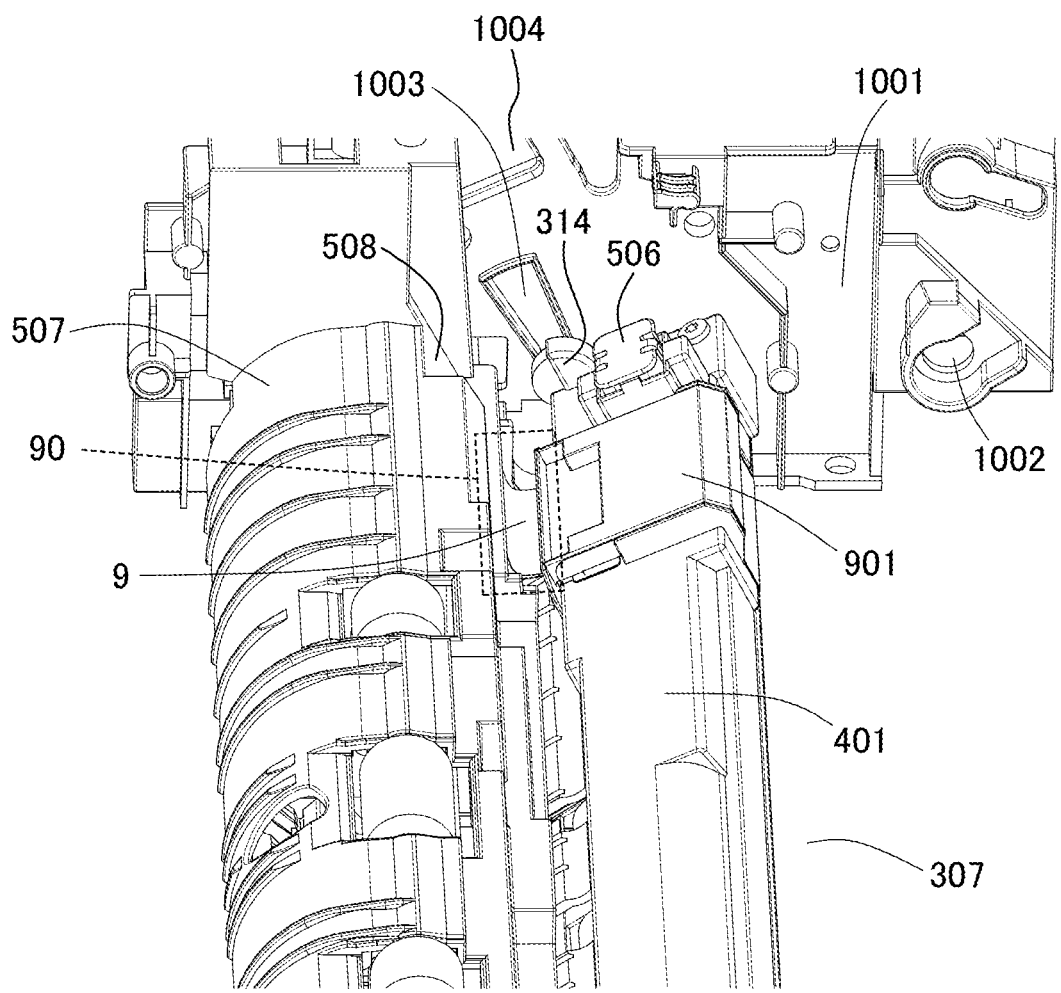
FIG. 10 is a perspective view illustrating a position of an exposed portion, positioned in an ADF of the present embodiment.
Figure 11:
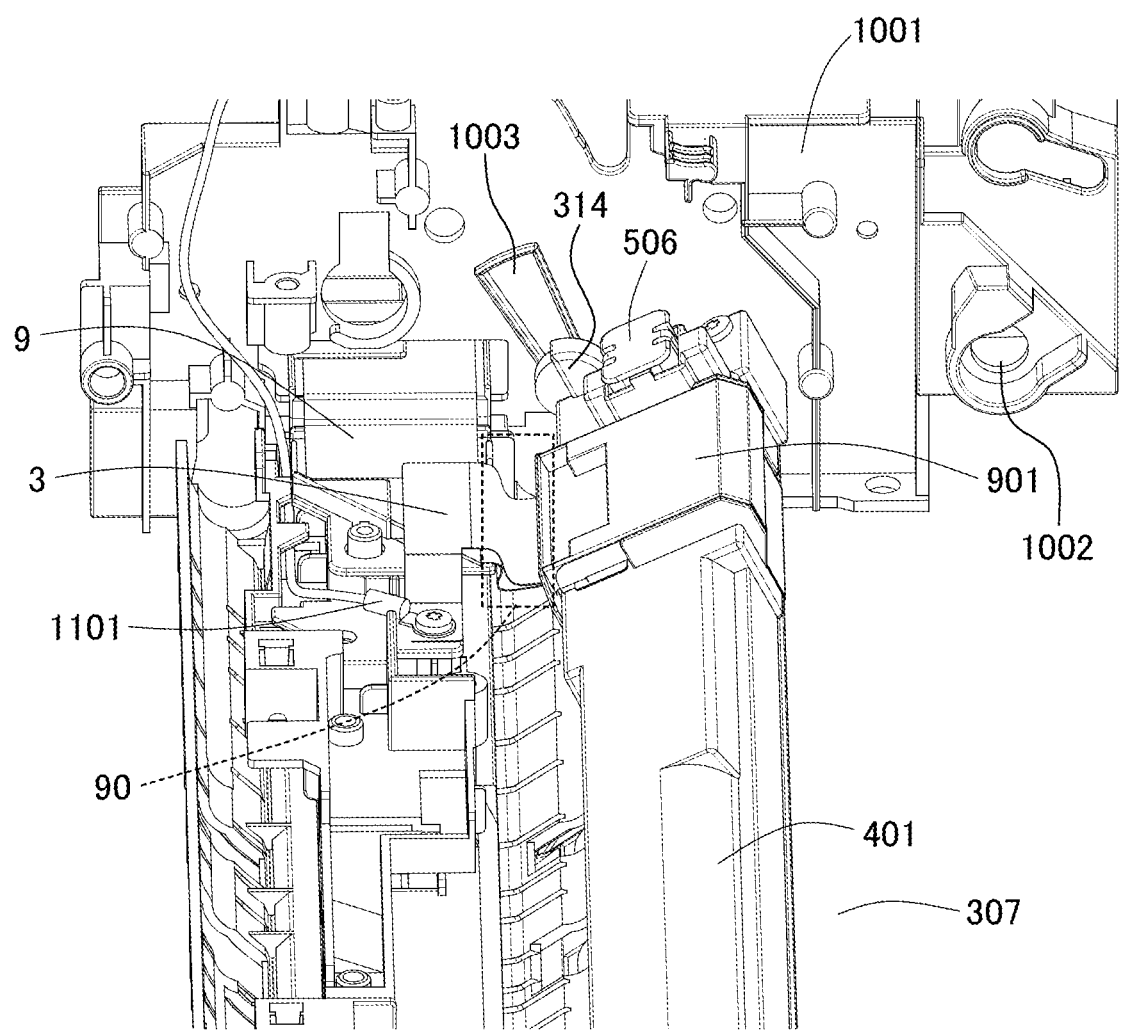
FIG. 11 is a perspective view illustrating arrangement of an FFC earth sheet, positioned in the ADF of the present embodiment.
Figure 12:
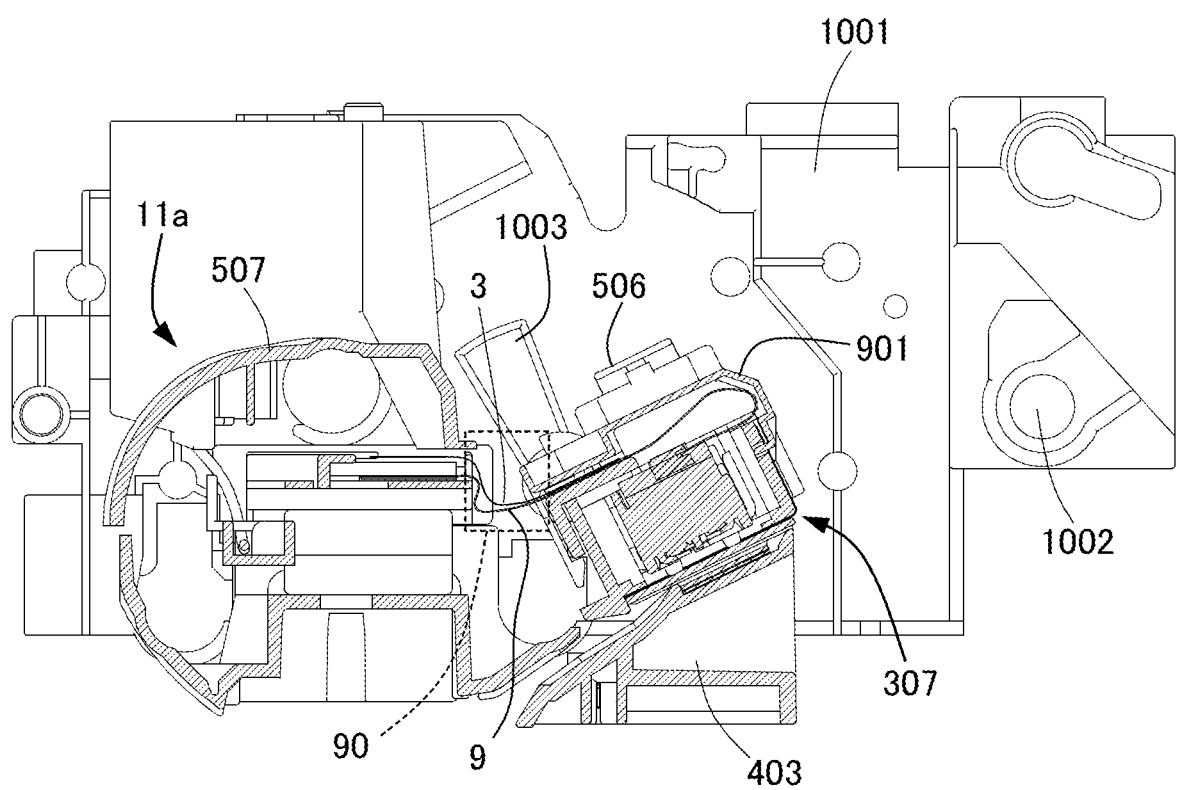
FIG. 12 is a cross-sectional view illustrating the arrangement of the FFC earth sheet of the present embodiment.

Next, a configuration of the FFC 9, which is connected to the second reading unit 307, will be described with reference to FIGS. 9 to 13. FIG. 9 is a perspective view illustrating a positional relationship between the second reading unit 307 and the FFC 9. FIGS. 10 to 12 are diagrams illustrating the position of the exposed portion 90 of the FFC 9, and the arrangement of an FFC earth sheet 3 that serves as a conductive sheet member.

As illustrated in FIG. 9, the FFC 9, which is one example of a flexible cable, is connected to the CIS 311 disposed in the second reading unit 307; and an FFC cover member 901 covers the connection portion of the FFC 9 so as to conceal the connection portion. As illustrated in FIG. 10, since the second reading unit 307 is configured so as to be able to pivot in the ADF 102, a portion of the FFC 9, which serves as the exposed portion 90, is exposed to the outside of the apparatus, when viewed from above, in a state where both the outer cover 12 and the separation guide member 500 are opened. That is, the exposed portion 90 of the FFC 9 bridges a space between the conveyance guide member 507 and the second reading unit 307, and the FFC 9 transmits an electric signal (i.e., an image signal). The exposed portion 90 is one example of a bridging portion. The exposed portion 90 is located between the main-body unit 102a and the second reading unit 307, and exposes to an outside of the main-body unit 102a and the second reading unit 307. However, if the portion of the FFC 9 is exposed to the outside of the apparatus, the static electricity may fly from fingertips of a user to the exposed portion of the FFC 9 when the user performs work, and may cause the failure of an electric component. Note that the exposed portion 90 is a portion of the FFC 9 that is exposed to the outside in the clearance between the conveyance guide member 507 fixed to the main-body unit 102a and the second reading unit 307, in a state where the outer cover 12 is located in the first open position and the separation guide member 500 is located in the second open position.

In the present embodiment, as illustrated in FIG. 11, the FFC earth sheet 3 that is a conductive sheet member is disposed so as to cover the exposed portion 90 from above. That is, the FFC earth sheet 3 covers a surface of the portion of the FFC 9 that is exposed to a user side. In addition, one end of the FFC earth sheet 3 is electrically grounded, via an earth wire 1101. That is, the FFC earth sheet 3 is one example of a shield member that has conductivity, and that is grounded. The FFC earth sheet 3 is disposed closer to the upper conveyance path 11a than the exposed portion 90 is. The FFC earth sheet 3 has conductivity and is grounded, so that the FFC earth sheet 3 discharges the static electricity, which is applied from the outside to the exposed portion 90, to the ground. The width of the FFC earth sheet 3 is substantially equal to the width of the FFC 9. However, the present disclosure is not limited to this. That is, the width of the FFC earth sheet 3 may be larger or smaller than the width of the FFC 9.

FIG. 12 is a cross-sectional view of the ADF 102 viewed from the front side of the ADF 102, and illustrates the arrangement of the FFC earth sheet 3. In the present embodiment, since a user accesses the components from above, the FFC earth sheet 3 is disposed so as to cover the upper side of the exposed portion 90 of the FFC 9.

Since the second reading unit 307 pivots as illustrated in FIGS. 5 to 8, the exposed portion 90 of the FFC 9 and a portion of the FFC earth sheet 3 that corresponds to the exposed portion 90 will be both bent an expected number of times of pivot motion of the second reading unit 307. Thus, it is necessary that the FFC earth sheet 3 be made of a material that can endure the expected number of bendings. In the present embodiment, the FFC earth sheet 3 is made of a metal-foil composite film. The metal-foil composite film is a composite material in which an aluminum foil is laminated on a PET base material made of polyester film. That is, the FFC earth sheet 3 is a film in which a metal layer and a polyester layer are laminated on each other.

Preferably, the FFC earth sheet 3 is disposed such that the aluminum-foil surface faces a direction from which the static electricity flies to the FFC 9, and that the PET base material faces the FFC 9. Specifically, in the present embodiment, the aluminum-foil surface is disposed above the FFC 9 in FIG. 12. That is, in the present embodiment, the FFC earth sheet 3 is disposed such that the polyester layer is closer to the FFC 9 than the metal layer is. With this arrangement, the FFC earth sheet 3 shields the FFC 9 against the static electricity while making the durability against bending higher than that of an FFC earth sheet 3 that is a simple aluminum sheet.

Figure 13:
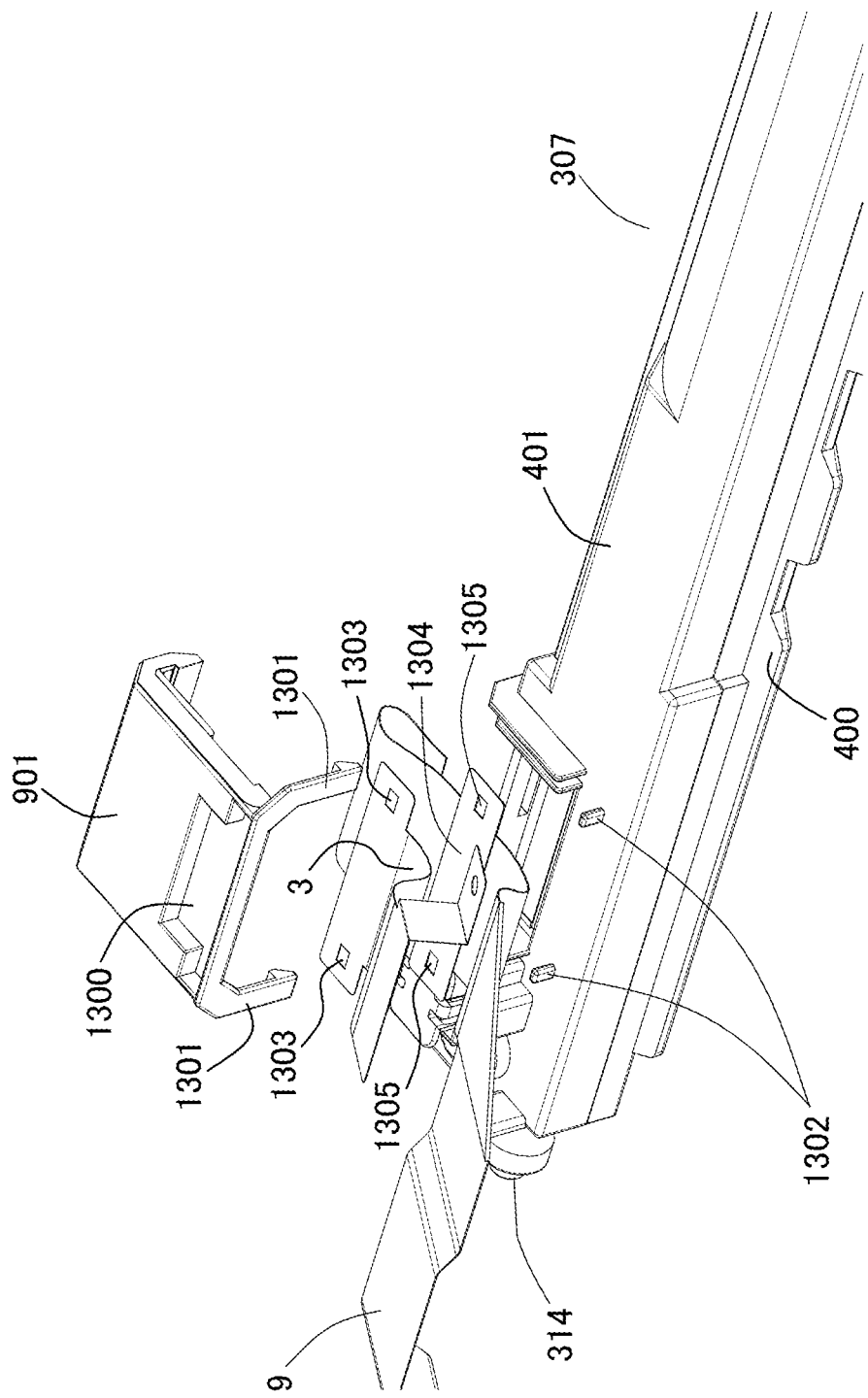
FIG. 13 is a perspective view illustrating the arrangement of the FFC earth sheet of the present embodiment, positioned in the second reading unit.

FIG. 13 illustrates a state where the FFC cover member 901, provided to the second reading unit 307, is removed from the second reading unit 307. With reference to FIG. 13, how the FFC earth sheet 3 is disposed in the second reading unit 307 will be described. FIG. 13 is a diagram illustrating the arrangement of the FFC earth sheet 3 disposed in the second reading unit 307. The second casing member 401, which constitutes the second reading unit 307, is provided with positioning projections 1302. The positioning projections 1302 are positioned at positions that correspond to the positions of positioning hole portions 1305 of an FFC positioning sheet 1304, and to the positions of positioning hole portions 1303 of the FFC earth sheet 3. The FFC positioning sheet 1304 is stuck on the FFC 9 for positioning the FFC 9. In the present embodiment, for preventing the FFC 9 and the FFC earth sheet 3 from becoming oblique in the pivot motion of the second reading unit 307, two positioning projections 1302 are disposed, separated from each other in the width direction. For the same reason, two positioning hole portions 1303 are disposed, separated from each other in the width direction; and two positioning hole portions 1305 are disposed, separated from each other in the width direction.

The FFC 9 is fixed to the second reading unit 307 by inserting (fitting) the positioning hole portions 1305 of the FFC positioning sheet 1304 in the positioning projections 1302. After the FFC 9 is fixed to the second reading unit 307, the positioning hole portions 1303 of the FFC earth sheet 3 are fit, from above, to the positioning projections 1302 for covering the upper side of the FFC 9 with the FFC earth sheet 3.

The FFC cover member 901 that serves as a fixing member is provided with an FFC fixing surface 1300. The FFC 9 and the FFC earth sheet 3 are nipped and fixed by the FFC fixing surface 1300 of the FFC cover member 901 and the top surface of the second casing member 401. In this configuration, the FFC 9 and the FFC earth sheet 3 are positioned and fixed in the second reading unit 307.

Second Document-Feeding-Reading Glass

Figure 14:
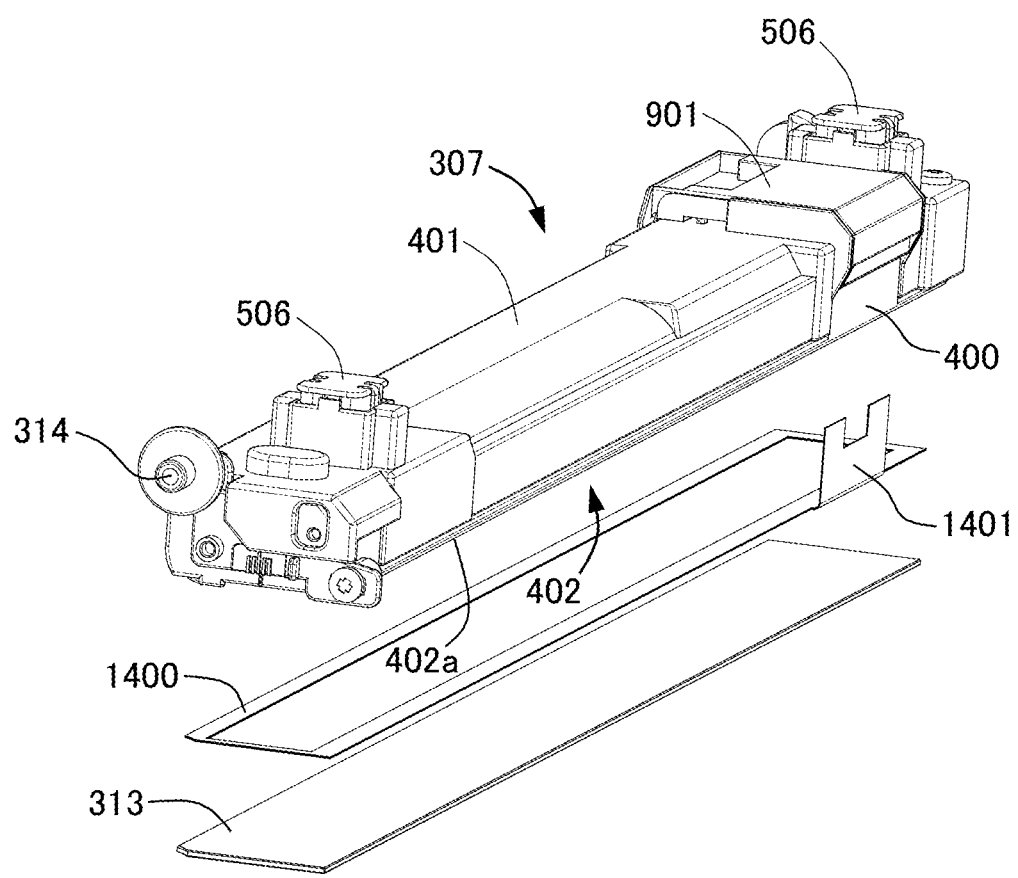
FIG. 14 is an exploded perspective view illustrating the second reading unit of the present embodiment.
Figure 15:
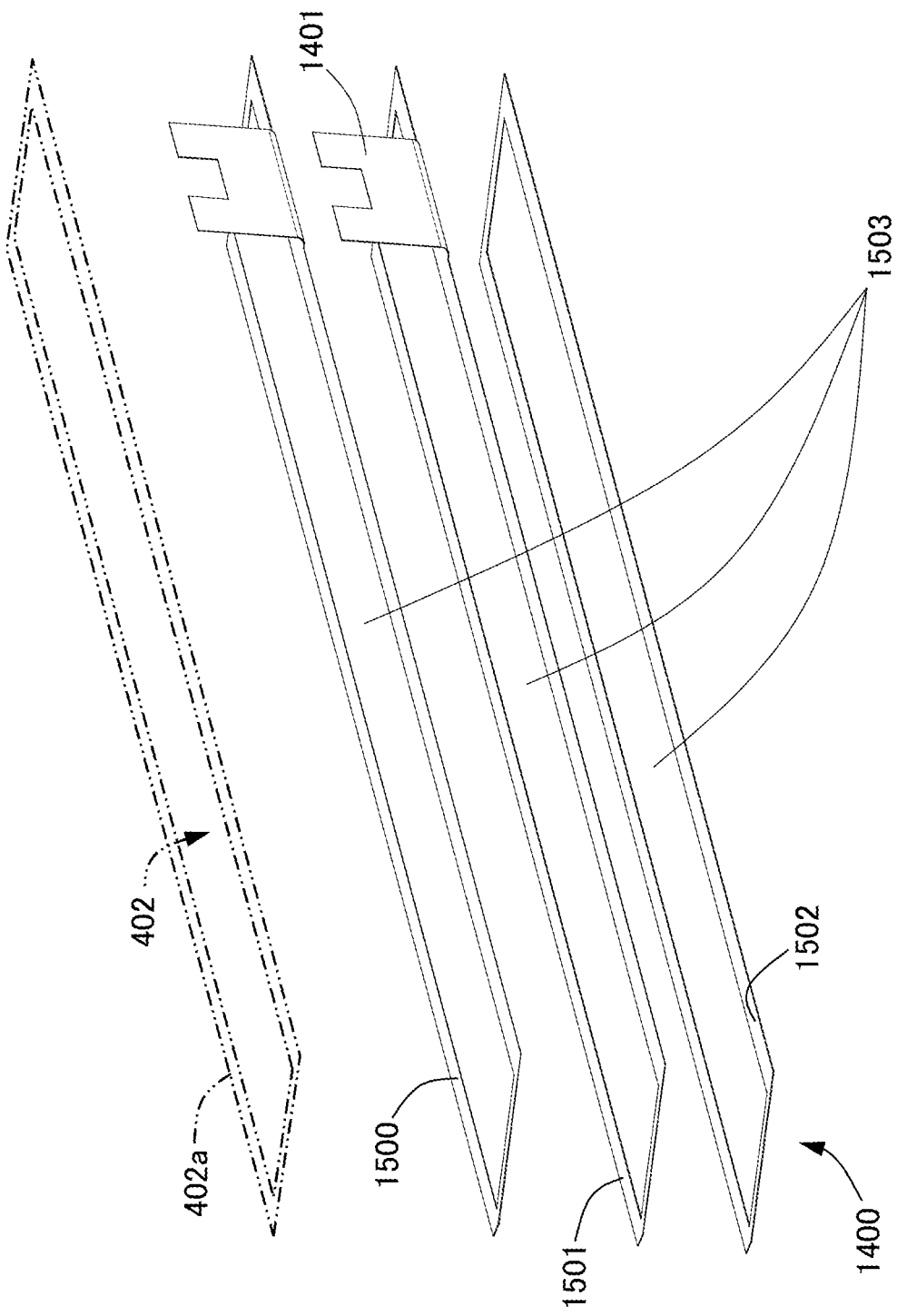
FIG. 15 is an exploded perspective view illustrating a glass earth sheet of the present embodiment.

Next, a configuration for fixing the second document-feeding-reading glass 313 disposed in the second reading unit 307 will be described with reference to FIGS. 14 to 17. FIGS. 14 to 17 are diagrams illustrating configurations of a glass earth sheet 1400 disposed on a portion of the second document-feeding-reading glass 313 of the present embodiment. As illustrated in FIGS. 14 and 15, the second document-feeding-reading glass 313 is stuck on the first casing member 400, which constitutes the second reading unit 307, by using the glass earth sheet 1400 such that the glass earth sheet 1400 does not cover the opening portion 402 of the first casing member 400. Thus, the glass earth sheet 1400 has a shape that does not cover the opening portion 402. In this manner, the second document-feeding-reading glass 313 is stuck on the first casing member 400 via the glass earth sheet 1400. The glass earth sheet 1400 is one example of a shield member. In addition, the glass earth sheet 1400 is stuck on the second document-feeding-reading glass 313, while having conductivity and grounded. In the present embodiment, the glass earth sheet 1400 is disposed between the first casing member 400 and the second document-feeding-reading glass 313. That is, the glass earth sheet 1400 is sandwiched between the first casing member 400 and the second document-feeding-reading glass 313.

The glass earth sheet 1400 is a conductive sheet member having adhesiveness. The glass earth sheet 1400 may be a double-sided conductive tape, or may be a member in which an aluminum-foil tape and a double-sided tape are combined with each other. The aluminum-foil tape has an adhesive layer on one side. In the present embodiment, both sides of the glass earth sheet 1400 are adhesive, so that the second document-feeding-reading glass 313 is stuck on the first casing member 400 via the glass earth sheet 1400. That is, the glass earth sheet 1400 fixes the second document-feeding-reading glass 313 on the first casing member 400 by pasting. In another case, as illustrated in FIG. 15, the glass earth sheet 1400 may include a first sticking portion 1500 that serves as a double-sided tape, a conductive sheet member 1501, and a second sticking portion 1502 that serves as a double-sided tape. In this case, the conductive sheet member 1501 may be stuck on the first sticking portion 1500, and the second sticking portion 1502 may be stuck on the conductive sheet member 1501. In another case, both sides of the conductive sheet member may be applied with adhesive, and the second document-feeding-reading glass 313 may be stuck on the first casing member 400 via the conductive sheet member 1501. In another case, the conductive sheet member 1501 may be directly sandwiched between the second document-feeding-reading glass 313 and the first casing member 400. In this case, the second document-feeding-reading glass 313 may be fixed to the first casing member 400 via a hook portion formed in the first casing member 400, or via screws.

The glass earth sheet 1400 includes an electrical-connection portion 1401 that serves as an electrical contact, for electrically grounding the glass earth sheet 1400, via the FFC cover member 901, as described below. That is, in the configuration illustrated in FIG. 15, the first sticking portion 1500 is disposed for bonding the first casing member 400 and the conductive sheet member 1501. Thus, the first sticking portion 1500 and the conductive sheet member 1501 have an identical shape, and the electrical-connection portion 1401 of the conductive sheet member 1501, as well as the other portion of the conductive sheet member 1501 can be stuck on the first casing member 400. Unlike the first sticking portion 1500, the second sticking portion 1502 does not have a shape that corresponds to the shape of the electrical-connection portion 1401 of the conductive sheet member 1501. This is because the second sticking portion 1502 has only to be used for sticking the second document-feeding-reading glass 313 on the conductive sheet member 1501.

In the present embodiment, the conductive sheet member 1501 is made of the above-described metal-foil composite film. That is, the metal-foil composite film that serves as the conductive sheet member 1501 is a composite material in which an aluminum foil is laminated on a PET base material made of polyester film. Thus, the conductive sheet member 1501 is a film in which the metal layer and the polyester layer are laminated on each other. The reason is that since the glass earth sheet 1400 has a shape 1503 that does not cover the opening portion 402, the glass earth sheet 1400 is required to have a certain level of hardness for sticking the glass earth sheet 1400 on the first casing member 400. If the glass earth sheet 1400 does not have the certain level of hardness, it will become difficult to stick the glass earth sheet 1400 on the first casing member 400. However, if it is ensured by using a jig or the like that the glass earth sheet 1400 can be stuck on the first casing member 400, a simple metal foil may be used instead of the metal-foil composite film.

Note that if the glass earth sheet 1400 is not disposed, a problem as described below may occur. That is, when a user performs work, such as the jam handling or the cleaning work for the second document-feeding-reading glass 313, in the vicinity of the second document-feeding-reading glass 313, static electricity may fly from fingertips of the user into the second reading unit 307 through a slight gap between the second document-feeding-reading glass 313 and the first casing member 400. Similarly, static electricity may fly from a document that is being conveyed, into the second reading unit 307 through a slight gap between the second document-feeding-reading glass 313 and the first casing member 400. If the static electricity enters the second reading unit 307 through the slight gap between the second document-feeding-reading glass 313 and the first casing member 400, the static electricity may flow to an electric component, such as an LED element disposed in the CIS 311; and may cause the failure of the electric component. Conventionally, the second document-feeding-reading glass 313 is stuck on the first casing member 400 via a simple double-sided tape that is not conductive. However, the double-sided tape is the same as an air layer, in terms of electricity. Thus, it is known that even if no gap seems to be formed, the static electricity passes through the double-sided tape, and may cause the failure of an electric component.

In the present embodiment, however, the whole circumference of the second document-feeding-reading glass 313 is stuck on the first casing member 400 via the conductive sheet member 1501, as illustrated in FIG. 15. Thus, the risk caused by the static electricity can be avoided. That is, the glass earth sheet 1400 is disposed on the edge portion 402a or the first casing member 400 so as to surround the whole circumference of the opening portion 402. In this configuration, the glass earth sheet 1400 discharges the static electricity applied from the lower conveyance path 11b side to the second document-feeding-reading glass 313.

Next, the relationship between the size of the glass earth sheet 1400 and the size of the opening portion 402 will be described. In the present embodiment, the glass earth sheet 1400 is formed such that the size and width of the glass earth sheet 1400 are equal to those of the edge portion 402a. As a result, the sticking area of the double-sided tape can be increased, so that the force for sticking the second document-feeding-reading glass 313 to the first casing member 400 and keeping the second document-feeding-reading glass 313 on the first casing member 400 can be increased. In another case, the glass earth sheet 1400 may be formed like a thin line for discharging the static electricity. In this case, however, since the sticking area of the double-sided tape is decreased, it is necessary to dispose another member, in addition to the glass earth sheet 1400, that keeps the second document-feeding-reading glass 313 on the first casing member 400. The glass earth sheet 1400 may overlap with the opening portion 402 unless the glass earth sheet 1400 interferes with the reading operation of the CIS 311.

Figure 16:
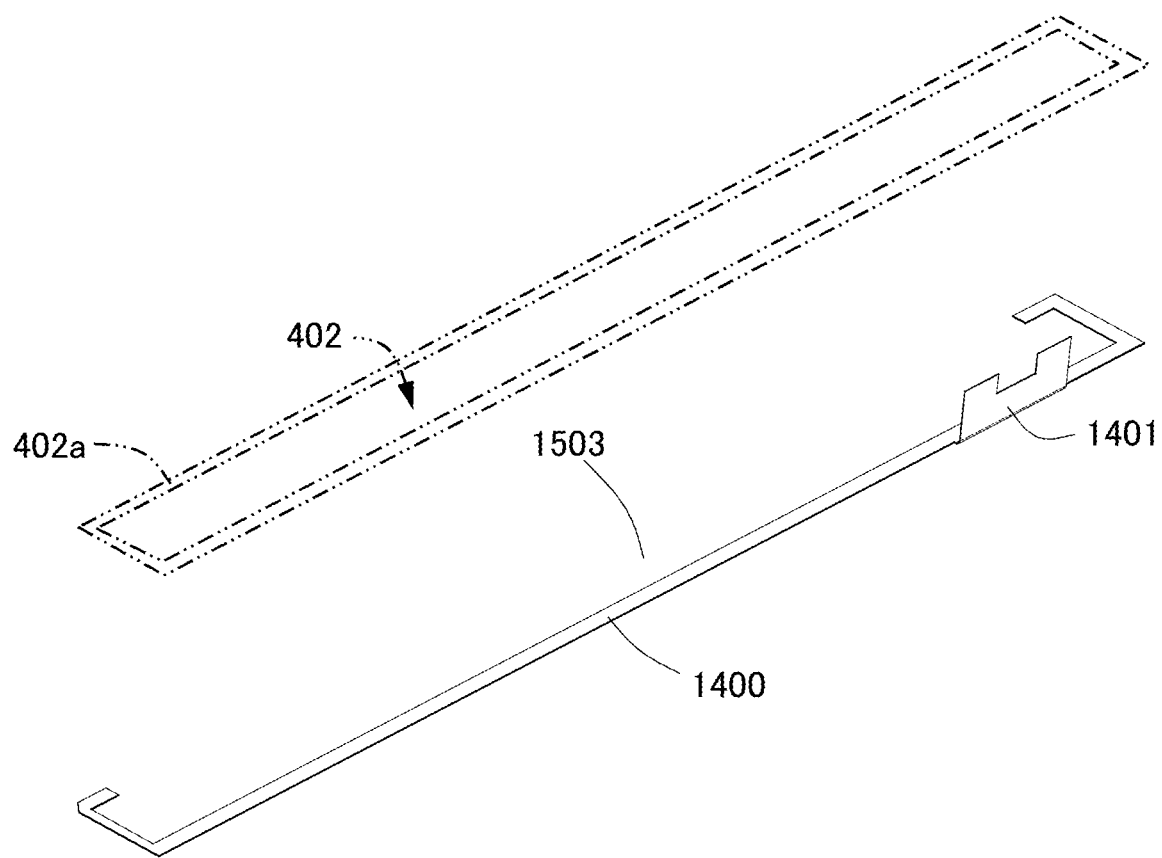
FIG. 16 is a perspective view illustrating a glass earth sheet of a modification of the present embodiment.
Figure 17:
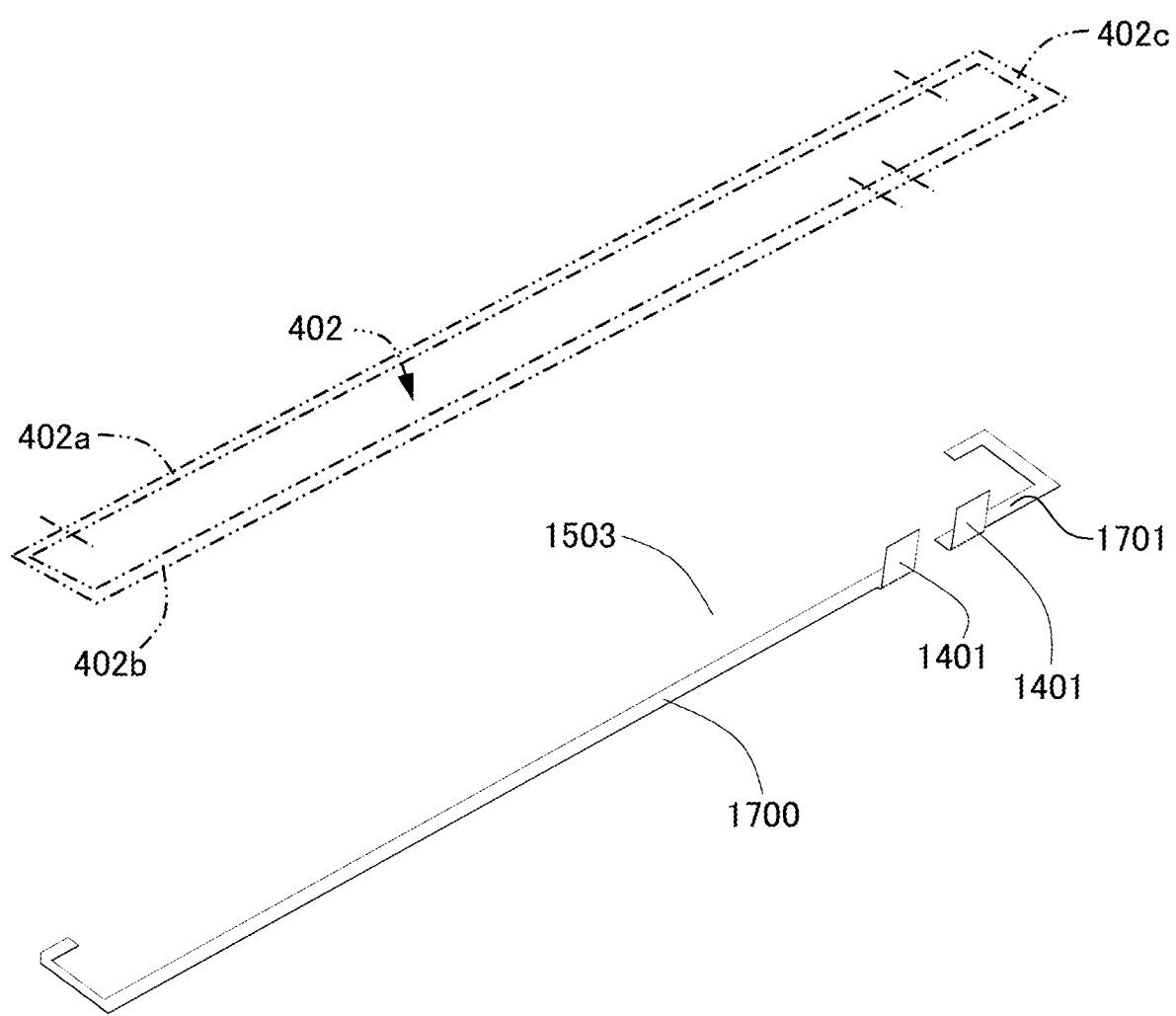
FIG. 17 is a perspective view illustrating a glass earth sheet of another modification of the present embodiment.

Note that there is a case where it is not necessary to cover the whole circumference of the second document-feeding-reading glass 313 with the conductive sheet member 1501 because of the layout of electric elements. In this case, one portion of the glass earth sheet 1400 may be cut out, for example, as illustrated in FIG. 16. That is, the glass earth sheet 1400 may be disposed on the edge portion 402a or the first casing member 400 so as to extend along a portion of the opening portion 402. Furthermore, if necessary for the ease of assembly or the like, the glass earth sheet 1400 may be constituted by a plurality of glass earth sheets, as illustrated in FIG. 17, disposed on different portions of the edge portion 402a. That is, the edge portion 402a or the opening portion 402 includes a first portion 402b, and a second portion 402c different from the first portion 402b. The first portion 402b is provided with a first glass earth sheet 1700 that is one example of a first shield member, and the second portion 402c is provided with a second glass earth sheet 1701 that is one example of a second shield member. The first glass earth sheet 1700 and the second glass earth sheet 1701 have the same structure as that of the glass earth sheet 1400, except that they have shapes different from the shape of the glass earth sheet 1400.

If the glass earth sheet 1400 has a shape, as illustrated in FIGS. 16 and 17, which does not extend along the whole circumference of the opening portion 402, the glass earth sheet 1400 is required to have a configuration for compensating for the shape. That is, since the area of the double-sided adhesive tape decreases, it is desirable to fully check whether the second document-feeding-reading glass 313 will peel off, and use a double-sided tape in addition to the glass earth sheet, as appropriate. In addition, in a portion of the edge portion 402a on which the glass earth sheet 1400 is not stuck, foreign matter may enter the second reading unit 307 through a gap between the second document-feeding-reading glass 313 and the edge portion 402a. Thus, it is desirable that the gap be sealed with a double-sided tape.

Figure 25A:
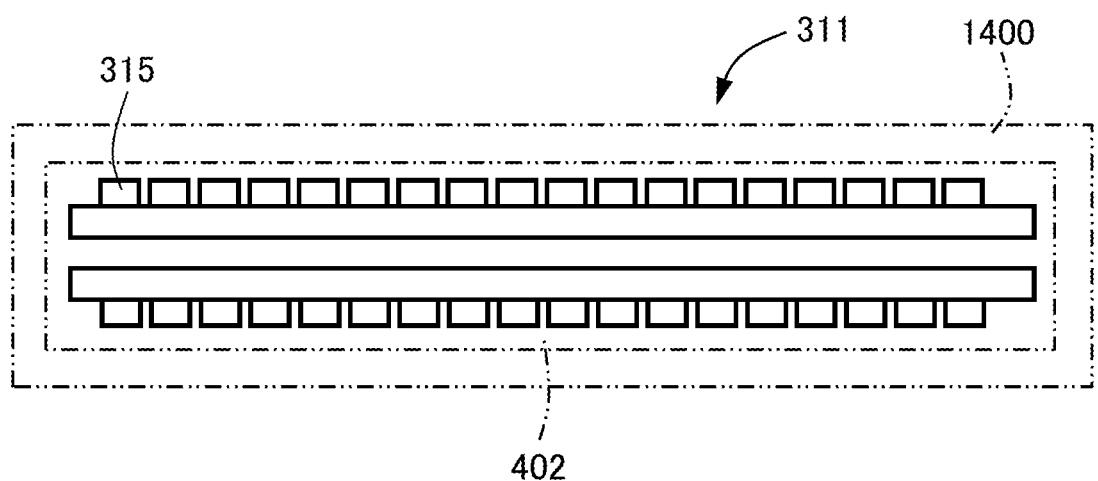
FIG. 25A is a plan view illustrating arrangement of LEDs that is made in a case where an LED array is used in a CIS of the present embodiment.
Figure 25B:
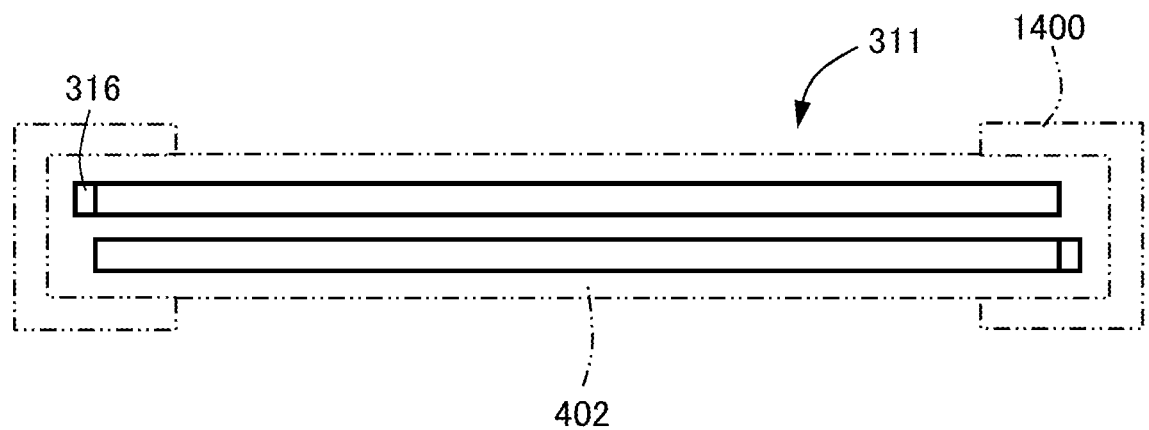
FIG. 25B is a plan view illustrating arrangement of LEDs that is made in a case where the LEDs are disposed at end portions of a CIS of the present embodiment.

Next, the relationship between the arrangement of LED elements of the CIS 311 and the shape of the glass earth sheet 1400 will be described with reference to FIGS. 25A and 25B. If the glass earth sheet 1400 is disposed separated from electric elements, such as LEDs of the CIS 311, by a predetermined distance, the risk that the static electricity is applied to the electric elements can be reduced. For example, the predetermined distance is in a range from about 10 to 20 mm, or is about 15 mm. Thus, if an LED array 315 is used in the CIS 311 as illustrated in FIG. 25A, it is desirable that the glass earth sheet 1400 be disposed so as to extend along the whole circumference of the opening portion 402. As illustrated in FIG. 25B, if LEDs 316 disposed in end portions of the CIS 311 are used in the CIS 311, the glass earth sheet 1400 has only to be disposed in the vicinity of each of the LEDs 316, separated from the LED 316 by a predetermined distance or less. In the present embodiment, the LEDs are disposed in end portions of the CIS 311, as illustrated in FIG. 25B, but the glass earth sheet 1400 is disposed so as to extend along the whole circumference of the opening portion 402, as illustrated in FIG. 25A. This arrangement of the glass earth sheet 1400 is used for reducing the deterioration of adhesive force that causes the second document-feeding-reading glass 313 to be stuck on the first casing member 400, and for reducing the possibility that the foreign matter enters the second reading unit 307 through a gap of a portion of the edge portion 402a, on which the glass earth sheet 1400 is not stuck.

Figure 18:
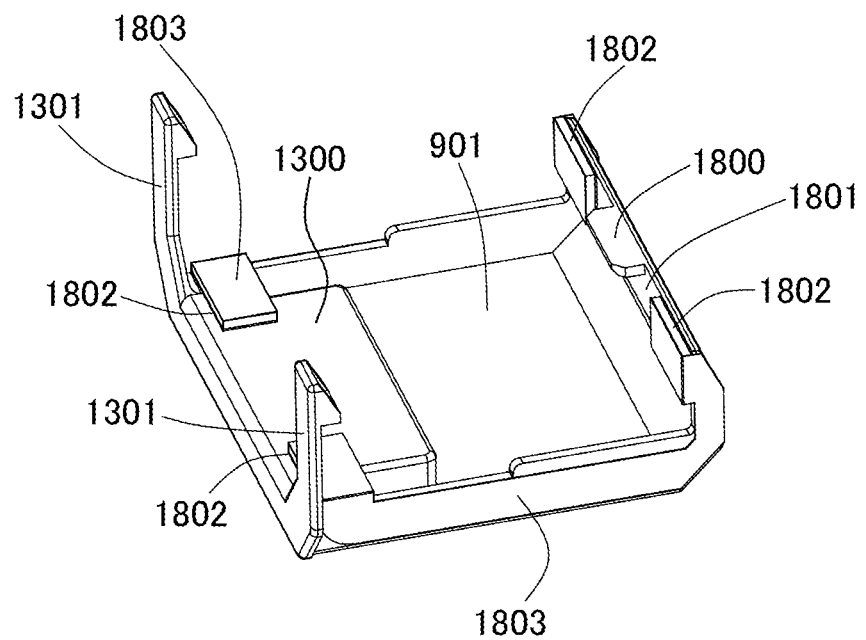
FIG. 18 is a perspective view illustrating an FFC cover member of the present embodiment.

Next, a configuration for grounding the electrical-connection portion 1401 of the glass earth sheet 1400 via the FFC cover member 901 will be described with reference to FIG. 18. FIG. 18 is a diagram illustrating a configuration of the FFC cover member 901 that covers the FFC earth sheet 3 of the present embodiment. As illustrated in FIG. 18, the FFC cover member 901 is provided with a surface 1801 that abuts against the first casing member 400, and the surface 1801 also abuts against the electrical-connection portion 1401 of the glass earth sheet 1400. On the abutment surface 1801, a catching portion 1800 is formed for catching a hole portion formed in the first casing member 400. The FFC cover member 901 includes the FFC fixing surface 1300 that fixes the FFC 9 and the FFC earth sheet 3. The FFC 9 and the FFC earth sheet 3 are nipped by the FFC fixing surface 1300 and the top surface of the second casing member 401, and thereby fixed.

The FFC cover member 901 is provided with snap-fit portions 1301. The snap-fit portions 1301 and the catching portion 1800 can be detachably attached to the second reading unit 307. In addition, four sponges 1802 that serve as elastic members are provided. Two of the sponges 1802 are disposed on the abutment surface 1801 of the FFC cover member 901, and the other two of the sponges 1802 are disposed on the FFC fixing surface 1300 of the FFC cover member 901. In addition, two conductive sheet members 1803 are provided. One of the conductive sheet members 1803 is disposed so as to connect the abutment surface 1801 and one of the sponges 1802 stuck on the FFC fixing surface 1300, and the other of the conductive sheet members 1803 is disposed so as to connect the abutment surface 1801 and the other of the sponges 1802 stuck on the FFC fixing surface 1300. The conductive sheet members 1803 are not required to have particular hardness and durability against bending. Thus, in the present embodiment, each of the conductive sheet members 1803 is an aluminum tape in which an adhesive layer is formed on an aluminum foil.

In this configuration, when the FFC cover member 901 is assembled to the second reading unit 307, one end portion of each of the conductive sheet members 1803 is brought into pressure contact with the electrical-connection portion 1401 of the glass earth sheet 1400 by the elastic force of a corresponding sponge 1802. In addition, the other end portion of each of the conductive sheet members 1803 is brought into pressure contact with the FFC earth sheet 3. As a result, all of the glass earth sheet 1400, the FFC earth sheet 3, and the earth wire 1101 are electrically connected with each other, and are electrically grounded. This configuration can make the number of components smaller than that in a configuration in which the glass earth sheet 1400 and the FFC earth sheet 3 are separately grounded.

Self-Supporting Operation

Figure 19:
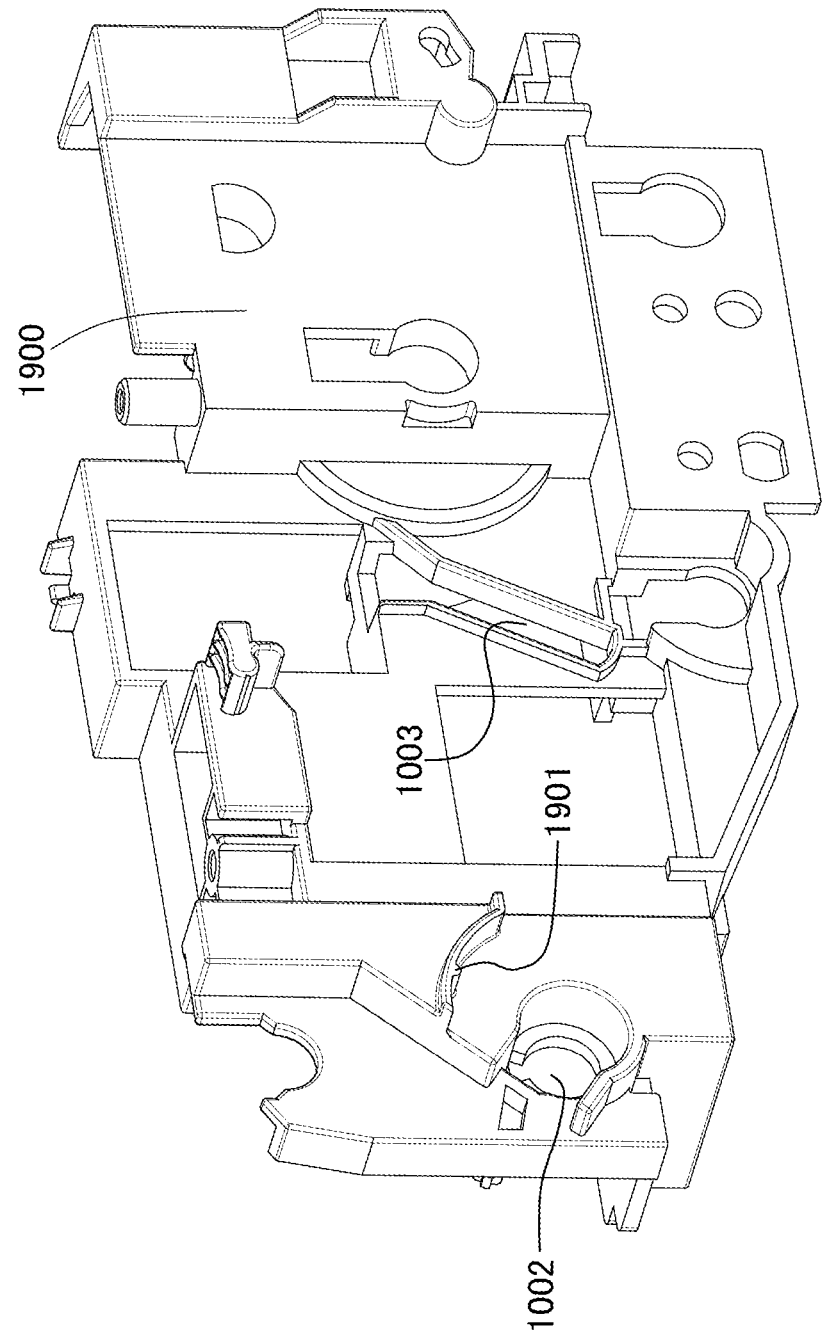
FIG. 19 is a perspective view illustrating a front side-plate of the present embodiment.
Figure 20:
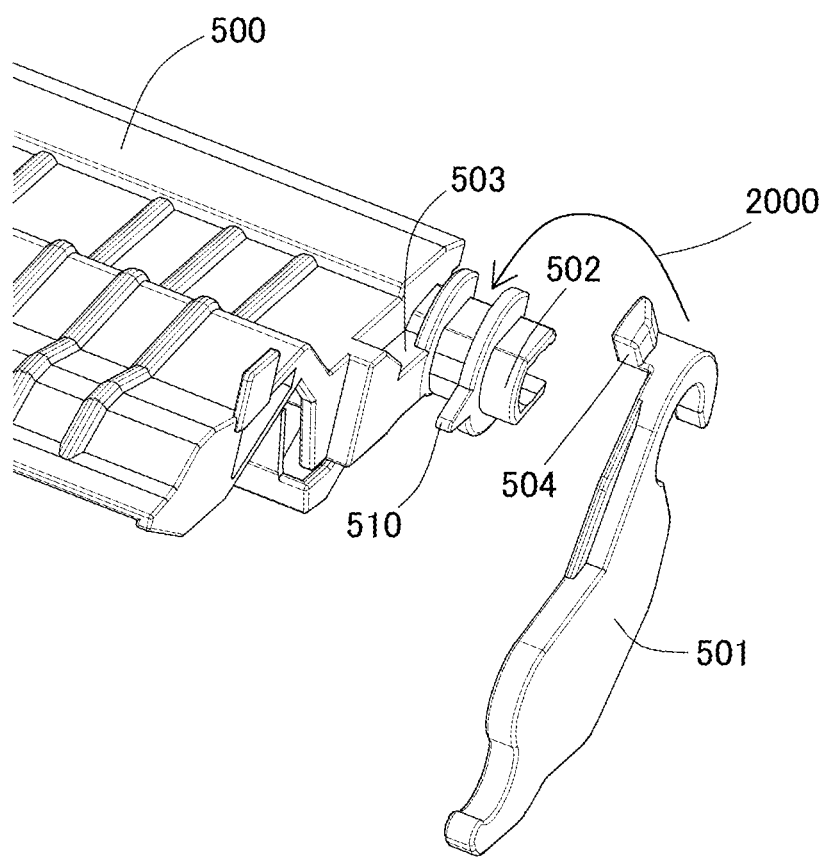
FIG. 20 is an exploded perspective view illustrating a separation guide member and a cam member of the present embodiment.
Figure 21:
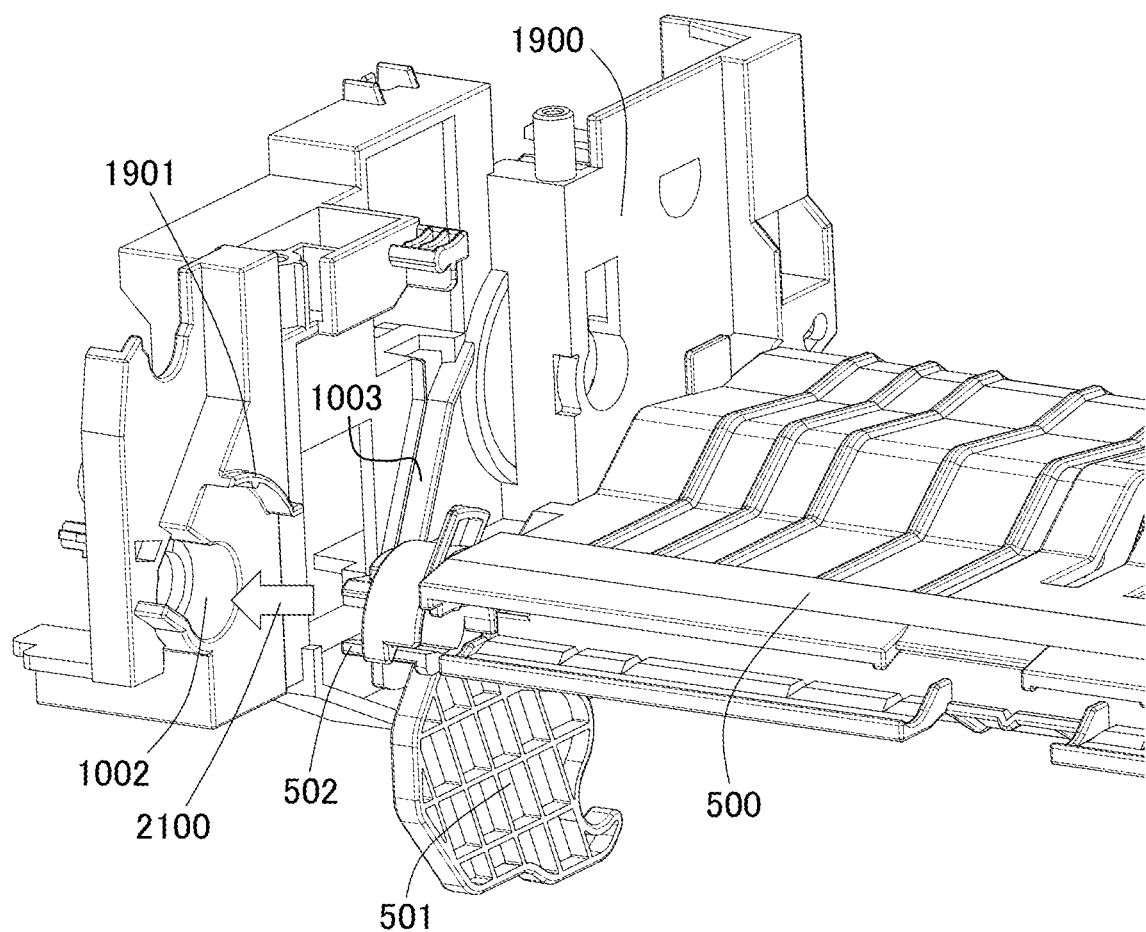
FIG. 21 is an exploded perspective view illustrating the front side-plate and the separation guide member of the present embodiment.
Figure 22:
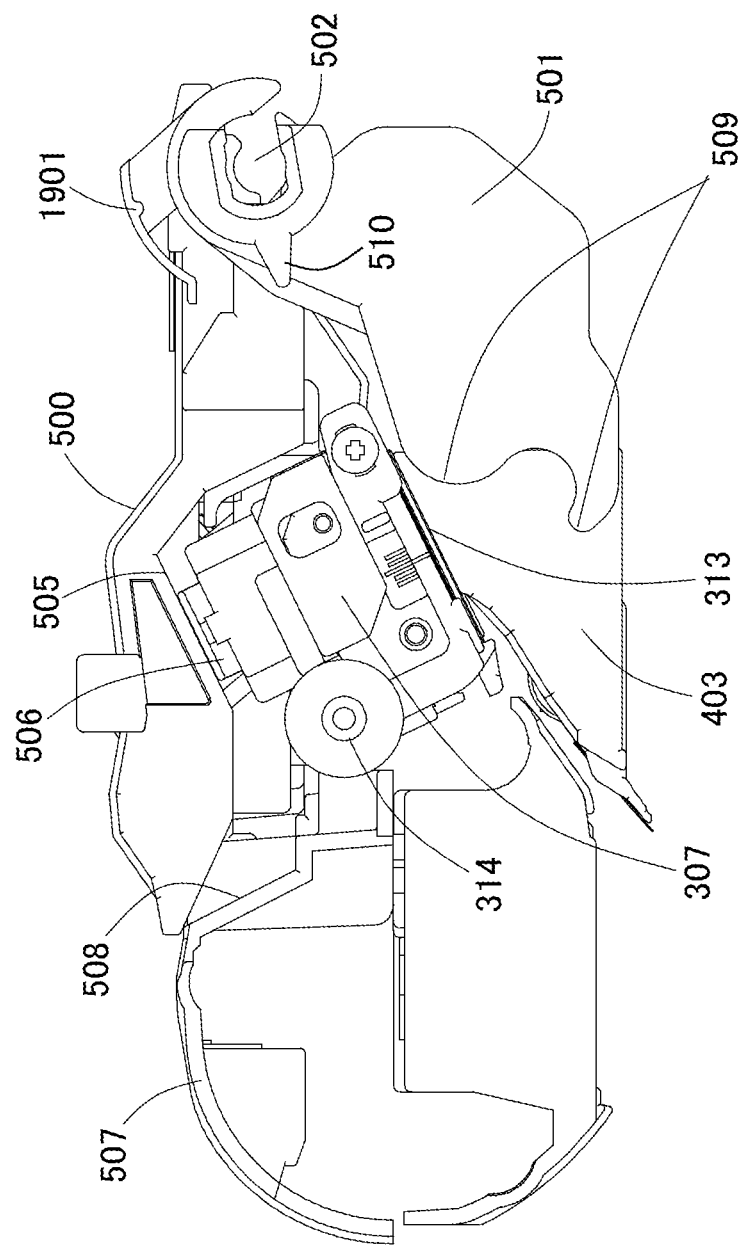
FIG. 22 is a front view illustrating a pivot regulation portion and a first projection portion of the present embodiment that are in a closed state.
Figure 23:
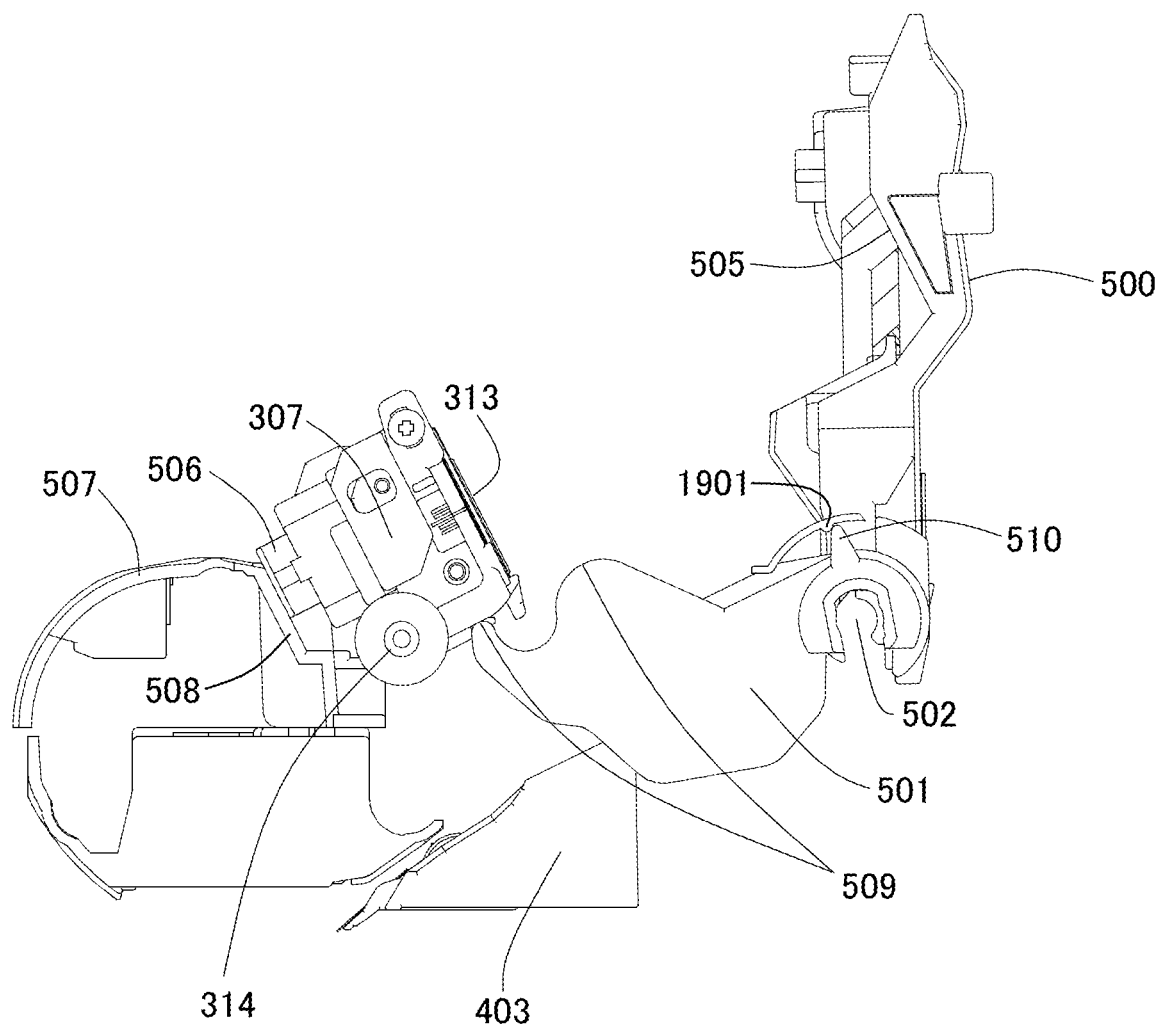
FIG. 23 is a front view illustrating the pivot regulation portion and the first projection portion of the present embodiment that are located in open positions.
Figure 24:
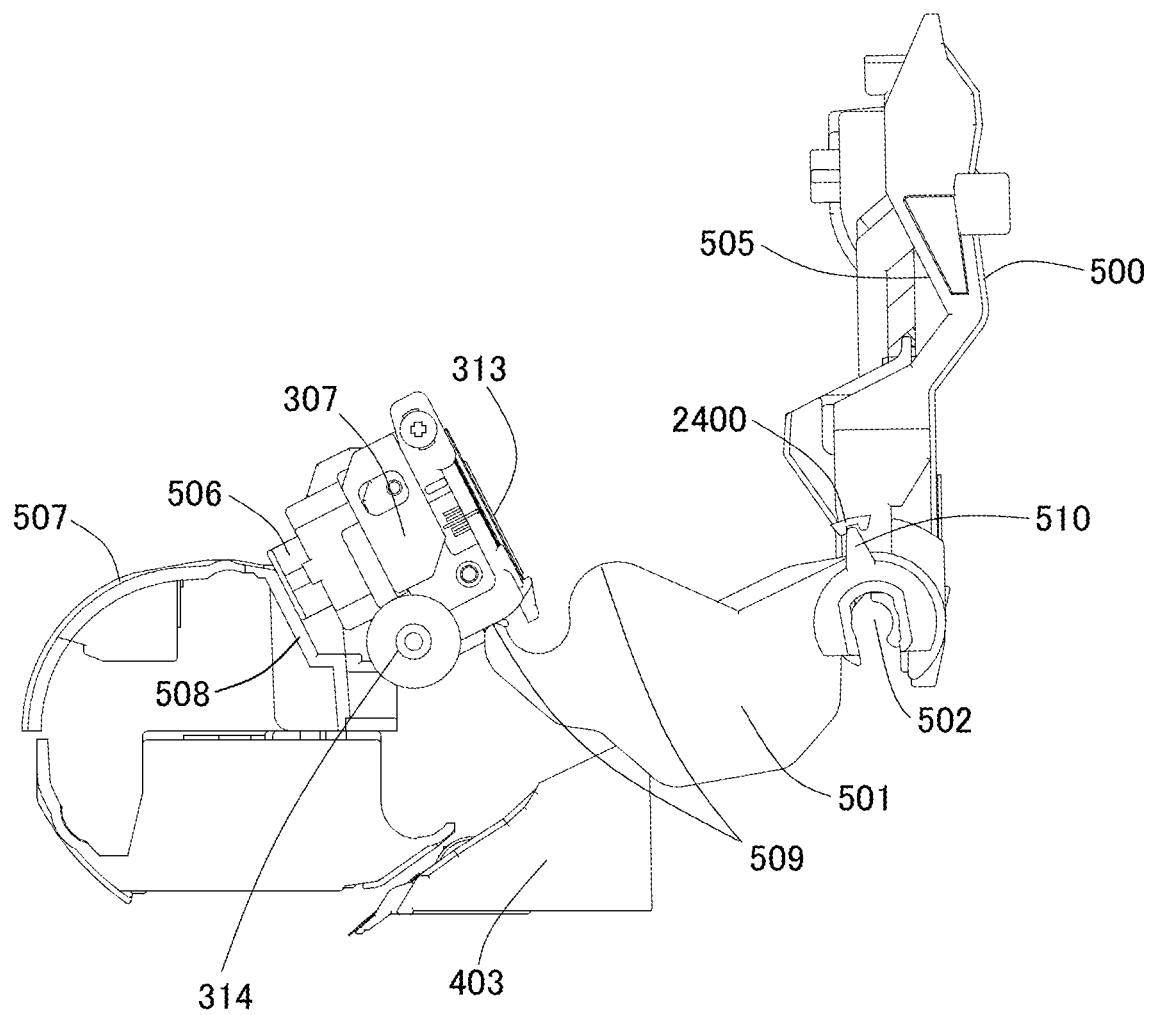
FIG. 24 is a front view illustrating a pivot regulation portion of a modification of the present embodiment.

Next, a self-supporting state of the separation guide member 500 and the second reading unit 307 will be described with reference to FIGS. 19 to 24. The self-supporting state is produced when the separation guide member 500 is pivoted until the separation guide member 500 enters the open state illustrated in FIG. 23 or 24. In the self-supporting state, the separation guide member 500 and the second reading unit 307 are regulated from pivoting. FIG. 19 is a diagram illustrating the second projection portion 1901 formed on the front side-plate 1900 of the present embodiment. FIG. 20 is a diagram illustrating a relationship between the separation guide member 500 and the cam member 501 of the present embodiment. FIG. 21 is a diagram illustrating a relationship between the separation guide member 500 and the front side-plate 1900 of the present embodiment. FIGS. 22 to 24 are diagrams each illustrating a relationship between the second projection portion 1901 and the first projection portion 510 of the present embodiment.

As illustrated in FIG. 19, the front side-plate 1900, which constitutes the frame in the ADF 102, is provided with a fitting groove portion 1003 that corresponds to a front pivot shaft 314 disposed in the second reading unit 307. The front pivot shaft 314 fits in the fitting groove portion 1003. In addition, the front side-plate 1900 is provided with a fitting hole portion 1002 that corresponds to a front pivot shaft 502 disposed in the separation guide member 500. The front pivot shaft 502 fits in the fitting hole portion 1002. In addition, the front side-plate 1900 is provided with the second projection portion 1901 that is formed in the vicinity of the fitting hole portion 1002, and that serves as a pivot regulation portion. The second projection portion 1901 abuts against the first projection portion 510 of the separation guide member 500, so that the second projection portion 1901 keeps the pivoted posture of the separation guide member 500 and prevents the separation guide member 500 from returning to its original posture.

As illustrated in FIG. 20, the cam member 501 is attached to the pivot shaft 502 of the separation guide member 500 on the front side-plate 1900 side. The cam member 501 is engaged with the pivot shaft 502 so as to be able to pivot around the pivot shaft 502. If the separation guide member 500 pivots by a predetermined angle or more, the first contact portion 503 formed in the separation guide member 500 and the second contact portion 504 formed in the cam member 501 abut against each other. As a result, the separation guide member 500 and the cam member 501 pivot in synchronization with each other. In the vicinity of the pivot shaft 502 of the separation guide member 500, the first projection portion 510 is formed.

As illustrated in FIGS. 21 to 23, the front side-plate 1900 and the separation guide member 500 are assembled to each other such that the pivot shaft 502 of the separation guide member 500 fits in the fitting hole portion 1002 of the front side-plate 1900. If the first projection portion 510 of the separation guide member 500 climbs over the second projection portion 1901 formed on the front side-plate 1900, the separation guide member 500 is prevented from returning to its original posture even if a user releases a hand from the separation guide member 500, so that the pivoted posture of the separation guide member 500 can be kept.

In addition, since the first contact portion 503 of the separation guide member 500 and the second contact portion 504 of the cam member 501 are in contact with each other, the pivoted posture of the cam member 501 is also kept. Furthermore, since the cam portion 509 of the cam member 501 supports the second reading unit 307, the pivoted posture of the second reading unit 307 is also kept. Thus, a user can perform the cleaning work for the second document-feeding-reading glass 313, which is disposed on the second reading unit 307, and the protective glass 404, which protects the white sheet 405, and the jam handling in a state where the hand of the user is separated from the separation guide member 500. Note that although the second projection portion 1901 is used, in the present embodiment, as the pivot regulation portion, the pivot regulation portion is not limited to this. For example, as illustrated in FIG. 24, the pivot regulation portion that corresponds to the first projection portion 510 may be a recess portion 2400, which corresponds to the first projection portion 510. Note that on the back side of the ADF 102, a back side-plate (not illustrated) is disposed, and in the back side-plate, a fitting groove portion and a fitting hole portion that are the same as those of the front side-plate 1900 are formed. The back side-plate supports the second reading unit 307 and the separation guide member 500, like the front side-plate 1900 does.

As described above, in the image forming apparatus 1 of the present embodiment, the glass earth sheet 1400 is disposed between the second document-feeding-reading glass 313 and the edge portion 402a of the first casing member 400. Thus, the static electricity is grounded via the glass earth sheet 1400, without entering the second reading unit 307 through a gap between the second document-feeding-reading glass 313 and the edge portion 402*a*. As a result, the possibility that the static electricity causes the failure of the electric component that constitutes the image reading apparatus can be reduced.

In addition, in the image forming apparatus 1 of the present embodiment, since both sides of the glass earth sheet 1400 have adhesiveness, the second document-feeding-reading glass 313 can be fixed to the edge portion 402*a* without using another member. As a result, the increase in the number of components and assembly processes can be suppressed.

In addition, in the image forming apparatus 1 of the present embodiment, the glass earth sheet 1400 is a film that includes the metal layer and the polyester layer, which are laminated on each other. Thus, the glass earth sheet 1400 has appropriate stiffness. As a result, the sticking work of the glass earth sheet 1400 can be made easier.

Note that in the above-described embodiment, the description has been made for the case where the glass earth sheet 1400 is disposed between the second document-feeding-reading glass 313 and the edge portion 402*a* of the first casing member 400. However, the present disclosure is not limited to this. That is, the glass earth sheet 1400 may be stuck on another portion as long as the static electricity applied from the lower conveyance path 11*b* side to the second document-feeding-reading glass 313 is discharged by the glass earth sheet 1400. For example, the glass earth sheet 1400 may be stuck on a surface of second document-feeding-reading glass 313 on the lower conveyance path 11*b* side, or may be stuck on an edge portion of the second document-feeding-reading glass 313. In these cases, however, since the second document-feeding-reading glass 313 cannot be stuck on the edge portion 402*a* via the glass earth sheet 1400, the use of an additional member, such as a double-sided tape, is required.

In the above-described embodiment, the description has been made for the case where the second reading unit 307 is used as the reading portion. However, the present disclosure is not limited to this. For example, the reading portion may be a reading sensor of an adjusting apparatus of the image forming apparatus 1. In this case, the adjusting apparatus causes the reading sensor to read the image of a sheet, on which the image has been fixed to the sheet, for performing image adjustment.

The present invention can suppress the static electricity from entering the reading portion through a gap between the transparent member and the casing of the reading portion.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-147717, filed Sep. 16, 2022 which is hereby incorporated by reference herein in its entirety.

What is claimed is:

1. An image reading apparatus comprising:
 a conveyance portion configured to convey a document in a conveyance path; and
 a reading portion configured to read an image of a document conveyed in the conveyance path,
 wherein the reading portion includes
  an image sensor configured to read an image of a document,
  a casing accommodating the image sensor and including an opening through which light passes to the image sensor,
  a transparent member fixed to the casing and covering the opening, and
  a shield member disposed between the transparent member and the casing, and electrically grounded.

2. The image reading apparatus according to claim 1,
 wherein both sides of the shield member have adhesiveness, and
 wherein the shield member fixes the transparent member on the casing by pasting.

3. The image reading apparatus according to claim 1, wherein the shield member includes a film that includes a metal layer and a polyester layer laminated on each other.

4. The image reading apparatus according to claim 1, wherein the shield member is disposed on the casing such that the shield member surrounds a whole circumference of the opening.

5. The image reading apparatus according to claim 1, wherein the shield member is disposed on the casing such that the shield member is located along a portion of an edge of the opening.

6. The image reading apparatus according to claim 5,
 wherein the opening includes a first area and a second area different from the first area,
 wherein the shield member is a first shield member disposed on the first area, and
 wherein the reading portion includes a second shield member stuck on the transparent member,
 having conductivity, grounded, and disposed on the second area.

7. The image reading apparatus according to claim 1, wherein the shield member is configured to discharge static electricity applied to the transparent member from a side of the conveyance path of the transparent member.

8. The image reading apparatus according to claim 1, further comprising:
 a first reading portion configured to read an image of a first side of a document; and
 a document platen glass on which a document is placed,
 wherein the reading portion is a second reading portion configured to read an image of a second side of a document opposite to the first side,
 wherein the first reading portion is configured to read an image of a document placed on the document platen glass while moving in a sub-scanning direction, and
 wherein the second reading portion is configured to read an image of a document in a position in which the second reading portion is fixed with respect to the conveyance portion relatively.

9. The image reading apparatus according to claim 8, wherein the second reading portion is configured to pivot between a reading position and an exposed position, the reading position being a position in which the second reading portion reads an image of a document, the exposed position being a position in which the second reading portion exposes the transparent member to an outside of the image reading apparatus.

10. An image forming apparatus comprising:
 the image reading apparatus according to claim 1; and an image forming portion configured to form an image that has been read by the image reading apparatus, on a sheet.

\* \* \* \* \*